United States Patent
Choi et al.

(10) Patent No.: US 12,470,708 B2
(45) Date of Patent: *Nov. 11, 2025

(54) CROSS-COMPONENT ADAPTIVE LOOP FILTERING-BASED IMAGE CODING APPARATUS AND METHOD

(71) Applicant: LG Electronics Inc., Seoul (KR)

(72) Inventors: Jangwon Choi, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,310

(22) Filed: Jun. 20, 2024

(65) Prior Publication Data
US 2024/0357099 A1 Oct. 24, 2024

Related U.S. Application Data

(63) Continuation of application No. 17/639,260, filed as application No. PCT/KR2020/011601 on Aug. 31, 2020, now Pat. No. 12,047,568.

(60) Provisional application No. 62/893,760, filed on Aug. 29, 2019.

(51) Int. Cl.
*H04N 19/117* (2014.01)
*H04N 19/132* (2014.01)
*H04N 19/169* (2014.01)
*H04N 19/174* (2014.01)
*H04N 19/176* (2014.01)
*H04N 19/186* (2014.01)
*H04N 19/70* (2014.01)
*H04N 19/80* (2014.01)

(52) U.S. Cl.
CPC ......... *H04N 19/117* (2014.11); *H04N 19/132* (2014.11); *H04N 19/174* (2014.11); *H04N 19/176* (2014.11); *H04N 19/186* (2014.11); *H04N 19/1883* (2014.11); *H04N 19/70* (2014.11); *H04N 19/80* (2014.11)

(58) Field of Classification Search
CPC .................................................. H04N 19/117
See application file for complete search history.

(56) References Cited

U.S. PATENT DOCUMENTS

2022/0248007 A1* 8/2022 Misra .................... H04N 19/70

* cited by examiner

*Primary Examiner* — Jerry T Jean Baptiste
(74) *Attorney, Agent, or Firm* — Fish & Richardson P.C.

(57) ABSTRACT

According to one embodiment of the present document, an in-loop filtering procedure in an image/video coding procedure may include a cross-component adaptive loop filtering procedure. CCALF according to the present embodiment can increase the accuracy of in-loop filtering.

4 Claims, 15 Drawing Sheets

(a)  (b)

CROSS-COMPONENT ADAPTIVE LOOP FILTERING-BASED IMAGE CODING APPARATUS AND METHOD

CROSS-REFERENCE TO RELATED APPLICATIONS

This application is a continuation of U.S. application Ser. No. 17/639,260, filed on Feb. 28, 2022, which is a National Stage application under 35 U.S.C. § 371 of International Application No. PCT/KR2020/011601, filed on Aug. 31, 2020, which claims the benefit of U.S. Provisional Application No. 62/893,760, filed on Aug. 29, 2019. The disclosures of the prior applications are incorporated by reference in their entirety.

BACKGROUND OF THE DISCLOSURE

Field of the Disclosure

The present disclosure is related to a cross-component adaptive loop filtering-based image coding apparatus and method.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

A cross-component adaptive loop filtering process (CCALF) is a process performed to improve accuracy of filtering within an in-loop filtering process, and discussion related to transmission of information used in the CCALF process is ongoing.

SUMMARY

The present disclosure provides a method and apparatus for increasing image/video coding efficiency.

The present disclosure also provides an efficient filtering application method and apparatus.

The present disclosure also provides an efficient ALF application method and apparatus.

According to an embodiment of the present disclosure, a filtering process may be performed on reconstructed chroma samples based on reconstructed luma samples.

According to an embodiment of the present disclosure, filtered reconstructed chroma samples may be modified based on reconstructed luma samples.

According to an embodiment of the present disclosure, information on whether CCALF is available may be signaled in an SPS.

According to an embodiment of the present disclosure, information on values of cross-component filter coefficients may be derived from ALF data (normal ALF data or CCALF data).

According to an embodiment of the present disclosure, identifier (ID) information of an APS including ALF data for deriving cross-component filter coefficients in a slice may be signaled.

According to an embodiment of the present disclosure, information on a filter set index for CCALF may be signaled in units of CTUs (blocks).

According to an embodiment of the present disclosure, a video/image decoding method performed by a decoding apparatus is provided.

According to an embodiment of the present disclosure, a decoding apparatus for performing video/image decoding is provided.

According to an embodiment of the present disclosure, a video/image encoding method performed by an encoding apparatus is provided.

According to an embodiment of the present disclosure, an encoding apparatus for performing video/image encoding is provided.

According to one embodiment of the present disclosure, there is provided a computer-readable digital storage medium in which encoded video/image information, generated according to the video/image encoding method disclosed in at least one of the embodiments of the present disclosure, is stored.

According to an embodiment of the present disclosure, there is provided a computer-readable digital storage medium in which encoded information or encoded video/image information, causing the decoding apparatus to perform the video/image decoding method disclosed in at least one of the embodiments of the present disclosure, is stored.

Advantageous Effects

According to an embodiment of the present disclosure, overall image/video compression efficiency may be increased.

According to an embodiment of the present disclosure, subjective/objective visual quality may be improved through efficient filtering.

According to an embodiment of the present disclosure, an ALF process may be efficiently performed and filtering performance may be improved.

According to an embodiment of the present disclosure, reconstructed chroma samples filtered based on reconstructed luma samples may be modified to improve picture quality and coding accuracy of a chroma component of a decoded picture.

According to an embodiment of the present disclosure, the CCALF process may be efficiently performed.

According to an embodiment of the present disclosure, ALF-related information may be efficiently signaled.

According to an embodiment of the present disclosure, CCALF-related information may be efficiently signaled.

According to an embodiment of the present disclosure, ALF and/or CCALF may be adaptively applied in units of pictures, slices, and/or coding blocks.

According to an embodiment of the present disclosure, when CCALF is used in the encoding and decoding method and apparatus for a still image or video, filter coefficients for CCALF and the on/off transmission method in a block or CTU unit may be improved, thereby increasing encoding efficiency.

DESCRIPTION OF EXEMPLARY EMBODIMENTS

Figure 1:
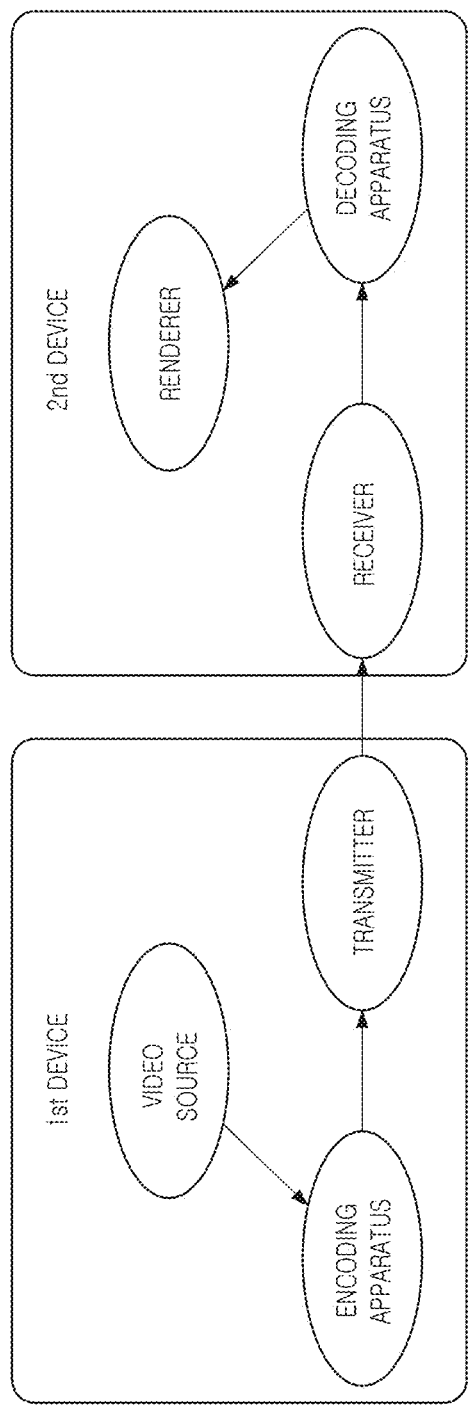
FIG. 1 schematically shows an example of a video/image coding system that may be applied to embodiments of the present disclosure.

The present disclosure may be modified in various forms, and specific embodiments thereof will be described and shown in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present disclosure is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the document of the present disclosure.

The present disclosure relates to video/image coding. For example, the methods/embodiments disclosed in the present disclosure may be applied to methods disclosed in a versatile video coding (VVC). In addition, methods/embodiments disclosed in the present disclosure may be applied to a method disclosed in an essential video coding (EVC) standard, an AOMedia video 1 (AV1) standard, a $2^{nd}$ generation audio video coding standard (AVS2), or a next generation video/image coding standard (e.g., H.267 or H.268, etc.).

The present disclosure presents various embodiments of video/image coding, and unless otherwise mentioned, these embodiments may be performed in combination with each other.

FIG. 1 illustrates an example of a video/image coding system to which the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render decoded video/image. The rendered video/image may be displayed through a display unit.

In the present disclosure, a video may mean a set of a series of images according to the passage of time. A picture generally means a unit representing one image in a specific time period, and a slice/tile is a unit constituting a part of a picture in coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit).

Meanwhile, one picture may be divided into two or more sub-pictures. The sub-picture may be a rectangular region of one or more slices within a picture).

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may mean a pixel value in the spatial domain, and when such a pixel value is transformed into the frequency domain, it may mean a transform coefficient in the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B (A or B)" may mean "only A", "only B", or "both A and B". In other words, "A or B (A or B)" in the present disclosure may be interpreted as "A and/or B (A and/or B)". For example, in the present disclosure "A, B or C (A, B or C)" means "only A", "only B", "only C", or "any and any combination of A, B and C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". Also, in the present disclosure, the expression "at least one of A or B" or "at least one of A and/or B" may be interpreted equally as "at least one of A and B)".

Also, in the present disclosure "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present disclosure may mean "for example". Specifically, when "prediction (intra prediction)" is indicated, it may be referred to as that "intra prediction" is proposed as an example of "prediction". In other words, "prediction" in the present disclosure is not limited to "intra prediction", and "intra prediction" may be proposed as an example of "prediction". Also, even when "prediction (i.e., intra prediction)" is indicated, it may be referred to as that "intra prediction" is proposed as an example of "prediction".

Technical features that are individually described in one drawing in the present disclosure may be implemented individually or simultaneously.

Hereinafter, embodiments of the present disclosure will be described with reference to the accompanying drawings. Hereinafter, the same reference numerals may be used for the same components in the drawings, and repeated descriptions of the same components may be omitted.

Figure 2:
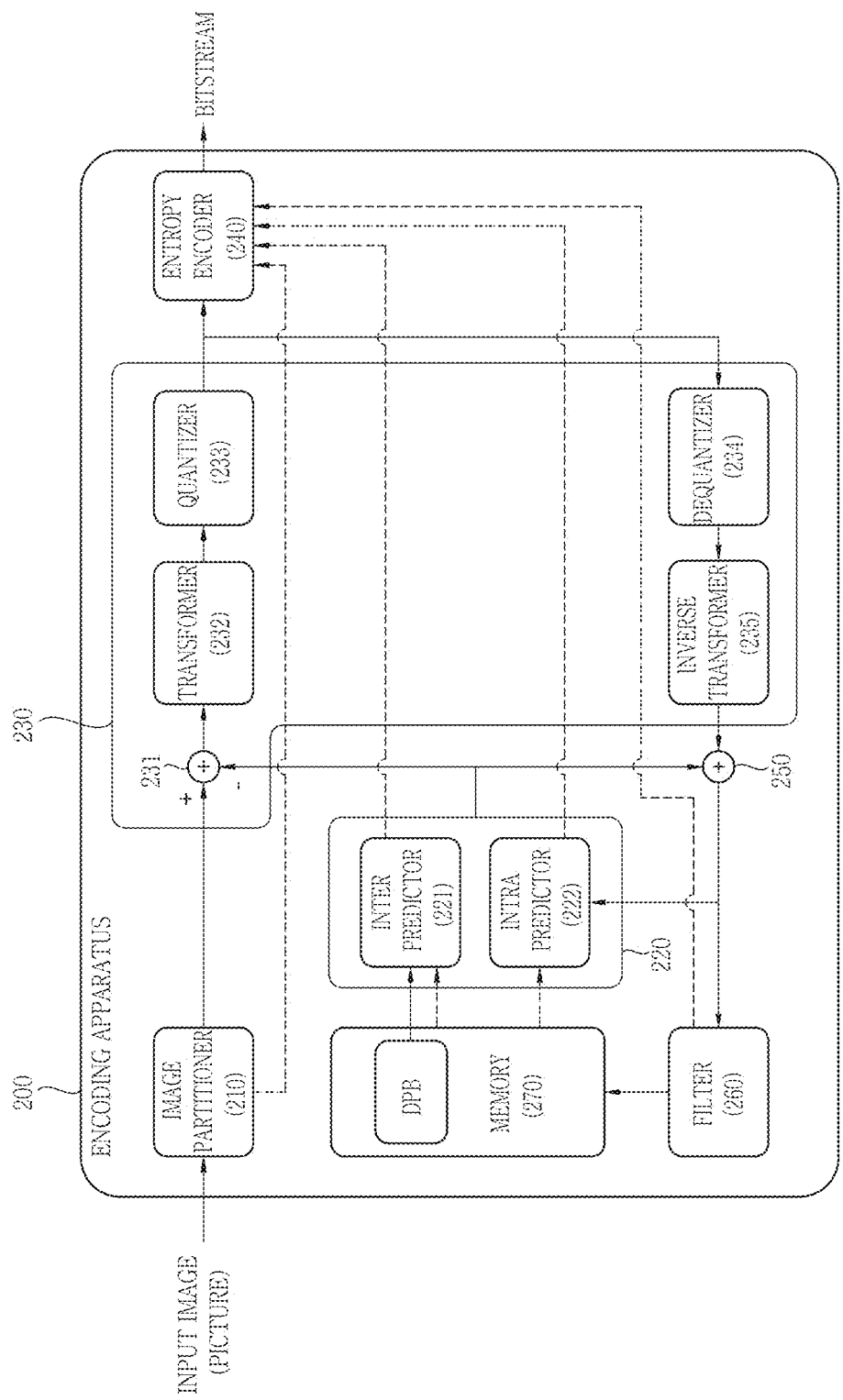
FIG. 2 is a diagram schematically illustrating a configuration of a video/image encoding apparatus that may be applied to embodiments of the present disclosure.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

The subtractor 231 subtracts the prediction signal (predicted block, prediction samples, or prediction sample array) output from the predictor 220 from the input image signal (original block, original samples, or original sample array) to obtain a residual A signal (a residual block, residual samples, or residual sample array) may be generated, and the generated residual signal is transmitted to the transformer 232. The predictor 220 may perform prediction on a processing target block (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The IBC prediction mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, Signaling/transmitted information and/or syntax elements described later in the present disclosure may be encoded through the aforementioned encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples or reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
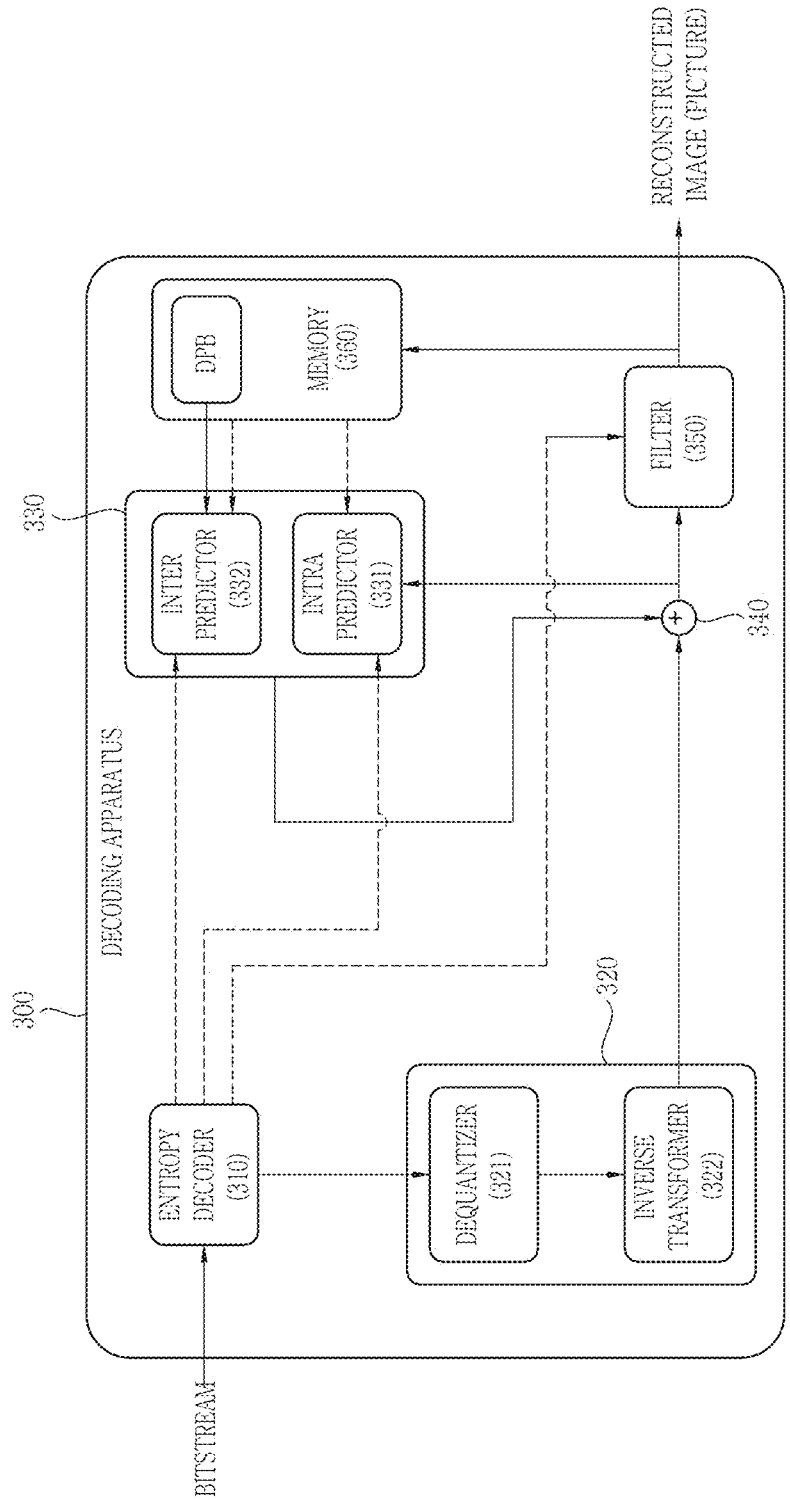
FIG. 3 is a diagram schematically illustrating a configuration of a video/image decoding apparatus that may be applied to embodiments of the present disclosure.

FIG. 3 is a schematic diagram illustrating a configuration of a video/image decoding apparatus to which the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and the information on residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330 the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC). The intra block copy may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor 330. If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this specification, the embodiments described in the prediction unit 330, the dequantizer 321, the inverse transformer 322, and the filter 350 of the decoding apparatus 300 are the predictor 220, the dequantizer 234, the inverse transformer 235, and the filter 260 may be applied in the same or corresponding manner.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency may be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present disclosure as well.

The predictor of the encoding apparatus/decoding apparatus may derive a prediction sample by performing inter prediction in units of blocks. Inter prediction may be a prediction derived in a manner that is dependent on data elements (e.g. Sample values, or motion information etc.) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
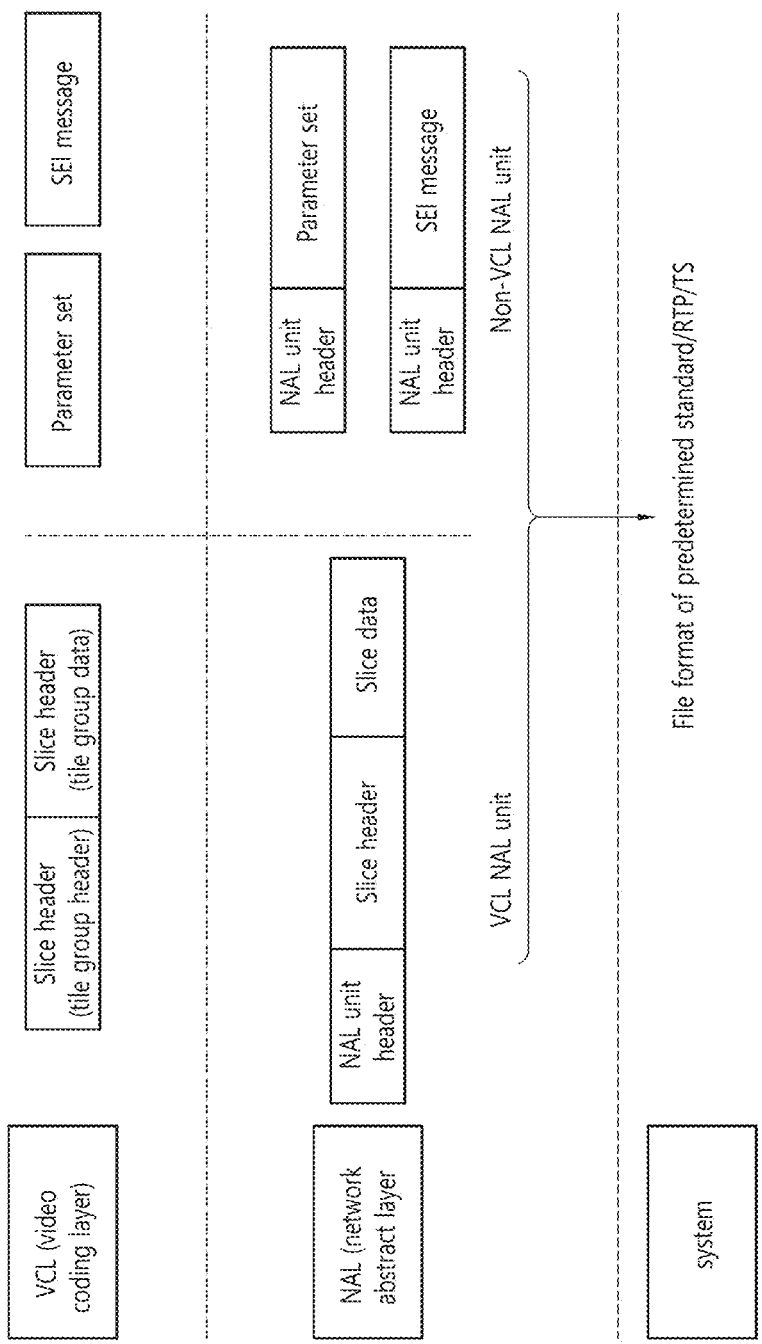
FIG. 4 exemplarily shows a hierarchical structure for a coded image/video.

FIG. 4 exemplarily shows a hierarchical structure for a coded image/video.

Referring to FIG. 4, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The aforementioned VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.
  APS (Adaptation Parameter Set) NAL unit: Type for NAL unit including APS
  DPS (Decoding Parameter Set) NAL unit: Type for NAL unit including DPS
  VPS (Video Parameter Set) NAL unit: Type for NAL unit including VPS
  SPS(Sequence Parameter Set) NAL unit: Type for NAL unit including SPS
  PPS (Picture Parameter Set) NAL unit: Type for NAL unit including PPS
  PH (Picture header) NAL unit: Type for NAL unit including PH The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present disclosure, a slice may be mixed or replaced with a tile group. Also, in the present disclosure, a slice header may be mixed or replaced with a tile group header.

The slice header (slice header syntax, slice header information) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present disclosure may include at least one of the APS syntax, the PPS syntax, the SPS syntax, the VPS syntax, the DPS syntax, and the slice header syntax.

In the present disclosure, the image/image information encoded from the encoding apparatus and signaled to the decoding apparatus in the form of a bitstream includes not only partitioning related information in a picture, intra/inter prediction information, residual information, in-loop filtering information, and the like, but also information included in a slice header, information included in the APS, information included in the PPS, information included in an SPS, and/or information included in the VPS.

Meanwhile, in order to compensate for a difference between an original image and a reconstructed image due to an error occurring in a compression coding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Hereinafter, detailed description of picture reconstruction and filtering will be described. In image/video coding, a reconstructed block may be generated based on intra prediction/inter prediction for each block, and a reconstructed picture including the reconstructed blocks may be generated. When the current picture/slice is an I picture/slice, blocks included in the current picture/slice may be reconstructed based only on intra prediction. Meanwhile, when the current picture/slice is a P or B picture/slice, blocks included in the current picture/slice may be reconstructed based on intra prediction or inter prediction. In this case, intra prediction may be applied to some blocks in the current picture/slice, and inter prediction may be applied to the remaining blocks.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When neighboring reference samples are derived, a prediction sample may be derived based on the average or interpolation of neighboring reference samples of the current block, and (ii) prediction among neighboring reference samples of the current block. The prediction sample may be derived based on a reference sample present in a specific (prediction) direction with respect to the sample. The case of (i) may be called a non-directional mode or a non-angular mode, and the case of (ii) may be called a directional mode or an angular mode. Also, based on the prediction sample of the current block among the neighboring reference samples, the second neighboring sample located in the opposite direction to the prediction direction of the intra prediction mode of the current block and the first neighboring sample are interpolated. A prediction sample may be generated. The above case may be referred to as linear interpolation intra prediction (LIP). In addition, chroma prediction samples may be generated based on luma samples using a linear model. This case may be called LM mode. In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC). In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction. In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction. The aforementioned intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the aforementioned LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

Hereinafter, intra prediction in an encoding apparatus will be described. The encoding apparatus performs intra prediction on the current block (S500). The encoding apparatus may derive an intra prediction mode for the current block, derive neighboring reference samples of the current block, and generate prediction samples in the current block based on the intra prediction mode and the neighboring reference samples. Here, the intra prediction mode determination, peripheral reference samples derivation, and prediction samples generation procedures may be performed simultaneously, or one procedure may be performed before another procedure. For example, the intra predictor 222 of the encoding device may include a prediction mode/type determiner, a reference sample deriver, and a prediction sample deriver, and the prediction mode/type determiner may determine an intra prediction mode/type for the current block, the reference sample deriver may derive neighboring reference samples of the current block, and the prediction sample deriver may derive motion samples of the current block. Meanwhile, although not shown, when a prediction sample filtering procedure to be described later is performed, the intra predictor 222 may further include a prediction sample filter (not shown). The encoding apparatus may determine a mode applied to the current block from among a plurality of intra prediction modes. The encoding apparatus may compare RD costs for the intra prediction modes and determine an optimal intra prediction mode for the current block.

Meanwhile, the encoding apparatus may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The encoding apparatus derives residual samples for the current block based on the prediction samples (S510). The encoding apparatus may compare the prediction samples in the original samples of the current block based on a phase and derive the residual samples.

The encoding apparatus may transform/quantize the residual samples to derive quantized transform coefficients (S520), and thereafter dequantizes/inverse-transforms the quantized transform coefficients again to derive (modified) residual samples (S530). The reason for performing the dequantization/inverse transformation again after the transform/quantization is to derive the same residual samples as the residual samples derived from the decoding apparatus as described above.

The encoding apparatus may generate a reconstructed block including reconstructed samples for the current block based on the prediction samples and the (modified) residual samples (S540). A reconstructed picture for the current picture may be generated based on the reconstructed block.

The encoding apparatus may encode image information including prediction information on the intra prediction (e.g., prediction mode information indicating a prediction mode) and residual information on the intra and the residual samples and output the encoded image information in the form of a bitstream, as described above. The residual information may include a residual coding syntax. The encoding apparatus may transform/quantize the residual samples to derive quantized transform coefficients. The residual information may include information on the quantized transform coefficients.

Figure 5:
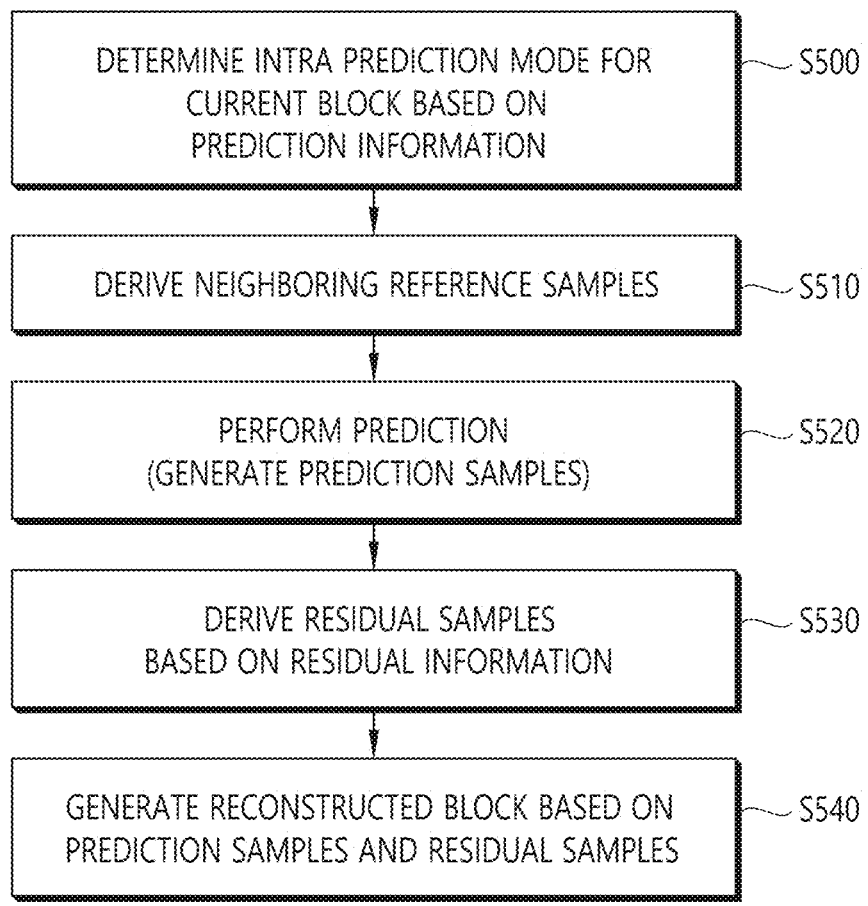
FIG. 5 is a flowchart illustrating an intra prediction-based block reconstructing method in a decoding apparatus.

FIG. 5 is a flowchart illustrating an intra prediction-based block reconstructing method in a decoding apparatus. The method of FIG. 5 may include steps S500, S510, S520, S530, and S540. The decoding apparatus may perform an operation corresponding to an operation performed in the encoding apparatus.

S500 to S520 may be performed by the intra predictor 331 of the decoding apparatus, and the prediction information of S500 and the residual information of S530 may be obtained from the bitstream by the entropy decoder 310 of the decoding apparatus. The residual processor 320 of the decoding apparatus may derive residual samples for the current block based on the residual information. Specifically, the dequantizer 321 of the residual processor 320 derives transform coefficients by performing dequantization based on the quantized transform coefficients derived based on the residual information, and the inverse transformer 322 of the residual processor may derive residual samples for the current block by performing inverse transform on the transform coefficients. S540 may be performed by the adder 340 or the reconstructor of the decoding apparatus.

Specifically, the decoding apparatus may derive an intra prediction mode for the current block based on the received prediction mode information (S500). The decoding apparatus may derive peripheral reference samples of the current block (S510). The decoding apparatus generates prediction samples in the current block based on the intra prediction mode and the neighboring reference samples (S520). In this case, the decoding apparatus may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The decoding apparatus generates residual samples for the current block based on the received residual information (S530). The decoding apparatus may generate reconstructed samples for the current block based on the prediction samples and the residual samples, and derive a reconstructed block including the reconstructed samples (S540). A reconstructed picture for the current picture may be generated based on the reconstructed block.

Here, the intra predictor 331 of the decoding apparatus may include a prediction mode/type determiner, a reference sample deriver, and a prediction sample deriver, and the prediction mode/type determiner may determine an intra prediction mode for the current block based on the prediction mode information obtained by the entropy decoder 310 of the decoding apparatus, the reference sample deriver may derive peripheral reference samples of the current block, and the prediction sample deriver may derive prediction samples of the current block. Meanwhile, although not shown, when the prediction sample filtering procedure described above is performed, the intra predictor 331 may further include a prediction sample filter (not shown).

The prediction information may include intra prediction mode information and/or intra prediction type information. The intra prediction mode information may include, for example, flag information (e.g., intra_luma_mpm_flag) indicating whether a most probable mode (MPM) is applied to the current block or a remaining mode is applied, and when MPM is applied to the current block, the prediction mode information may further include index information (e.g., intra_luma_mpm_idx) indicating one of the intra prediction mode candidates (MPM candidates). The intra prediction mode candidates (MPM candidates) may include an MPM candidate list or an MPM list. In addition, when the MPM is not applied to the current block, the intra prediction mode information may further include remaining mode information (e.g., Intra_luma_mpm_remainder) indicating one of the remaining intra prediction modes except for the intra prediction mode candidates (MPM candidates). The decoding apparatus may determine the intra prediction mode of the current block based on the intra prediction mode information. A separate MPM list may be configured for the aforementioned MIP.

In addition, the intra prediction type information may be implemented in various forms. For example, the intra prediction type information may include intra prediction type index information indicating one of the intra prediction types. As another example, the intra prediction type information may include at least one of reference sample line information (e.g., Intra_luma_ref_idx) indicating whether the MRL is applied to the current block and, if applied, which reference sample line is used, ISP flag information (e.g., Intra_subpartitions_mode_flag) indicating whether the ISP is applied to the current block, ISP type information (e.g., Intra_subpartitions_split_flag) indicating a split type of subpartitions when the ISP is applied, flag information indicating whether PDCP is applied or flag infomrationo indicating whether an LIP is applied. In addition, the intra prediction type information may include a MIP flag indicating whether MIP is applied to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC, CAVLC) coding based on a truncated (rice) binary code.

The predictor of the encoding apparatus/decoding apparatus may derive prediction samples by performing inter prediction on a block-by-block basis. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector on a reference picture indicated by a reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include a motion vector and a reference picture index. The motion information may further include inter-prediction type (L0 prediction, L1 prediction, Bi prediction, etc.) information. When inter prediction is applied, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and flag or index information indicating which candidate is selected (used) to derive the motion vector and/or the reference picture index of the current block may be signaled. The inter prediction may be performed based on various prediction modes and for example, in the case of a skip mode and a merge mode, the motion information of the current block may be the same as motion information of a neighboring block. In the case of the skip mode, the residual signal may not be transmitted unlike the merge mode. In the case of a motion vector prediction (MVP) mode, the motion vector of the selected neighboring block is used as a motion vector predictor and a motion vector difference may be signaled. In this case, the motion vector of the current block may be derived using the sum of the motion vector predictor and the motion vector difference.

Hereinafter, an inter prediction procedure by an encoding apparatus will be described. The encoding apparatus performs inter prediction on the current block. The encoding apparatus may derive the inter prediction mode and motion information of the current block, and generate prediction samples of the current block. Here, the procedures for determining the inter prediction mode, deriving motion information, and generating prediction samples may be performed simultaneously, or one procedure may be performed before another procedure. For example, the inter predictor 221 of the encoding apparatus may include a prediction mode determiner, a motion information deriver, and a prediction sample deriver, and the prediction mode determiner may determine the prediction mode for the current block, the motion information deriver may derive the motion information of the current block, and the prediction sample deriver may derive the motion samples of the current block. For example, the inter predictor 221 of the encoding apparatus may search for a block similar to the current block within a predetermined area (search area) of reference pictures through motion estimation, and may derive a reference block in which a difference from the current block is minimal or a predetermined reference or less. Based on this, a reference picture index indicating a reference picture in which the reference block is located may be derived, and a motion vector may be derived based on a position difference between the reference block and the current block. The encoding apparatus may determine a mode applied to the current block from among various prediction modes. The encoding apparatus may compare rate-distortion (RD) costs for the various prediction modes and determine an optimal prediction mode for the current block.

For example, when a skip mode or a merge mode is applied to the current block, the encoding apparatus may construct a merge candidate list to be described later and derive a reference block in which a difference from the current block is minimal or a predetermined reference or less, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the encoding apparatus constructs an (A)MVP candidate list to be described later, and use a motion vector of a selected mvp candidate, among motion vector predictor (mvp) candidates included in the (A)MVP candidate list, as an mvp of the current block. In this case, for example, a motion vector indicating a reference block derived by the motion estimation described above may be used as the motion vector of the current block, and an mvp candidate having a motion vector having the smallest difference from the motion vector of the current block, among the mvp candidates, may be the selected mvp candidate. A motion vector difference (MVD) that is a difference obtained by subtracting the mvp from the motion vector of the current block may be derived. In this case, information on the MVD may be signaled to the decoding apparatus. In addition, when the (A)MVP mode is applied, the value of the reference picture index may be configured as reference picture index information and separately signaled to the decoding apparatus.

The encoding apparatus may derive residual samples based on the prediction samples (S710). The encoding apparatus may derive the residual samples by comparing original samples of the current block with the prediction samples.

The encoding apparatus transforms/quantizes the residual samples to derive quantized transform coefficients (S720), and then dequantizes/inverse-transforms the quantized transform coefficients again to derive (modified) residual samples (S730). The reason for performing the dequantization/inverse transformation again after the transform/quantization is to derive the same residual samples as the residual samples derived from the decoding apparatus as described above.

The encoding apparatus may generate a reconstructed block including reconstructed samples for the current block based on the prediction samples and the (modified) residual samples (S740). A reconstructed picture for the current picture may be generated based on the reconstructed block.

Although not shown, as described above, the encoding apparatus 100 may encode video information including prediction information and residual information. The encoding apparatus 100 may output the encoded image information in the form of a bitstream. The prediction information may be information related to a prediction procedure and may include prediction mode information (e.g., skip flag, merge flag, or mode index) and motion information. The motion information may include candidate selection information (e.g., merge index, mvp flag, or mvp index) that is information for deriving a motion vector. In addition, the information on the motion information may include the aforementioned MVD information and/or reference picture index information. In addition, the information on the motion information may include information indicating whether L0 prediction, L1 prediction, or bi prediction is applied. The residual information is information on residual samples. The residual information may include information on quantized transform coefficients for residual samples.

The output bitstream may be stored in a (digital) storage medium and transmitted to a decoding apparatus or may be transmitted to a decoding apparatus through a network.

Figure 6:
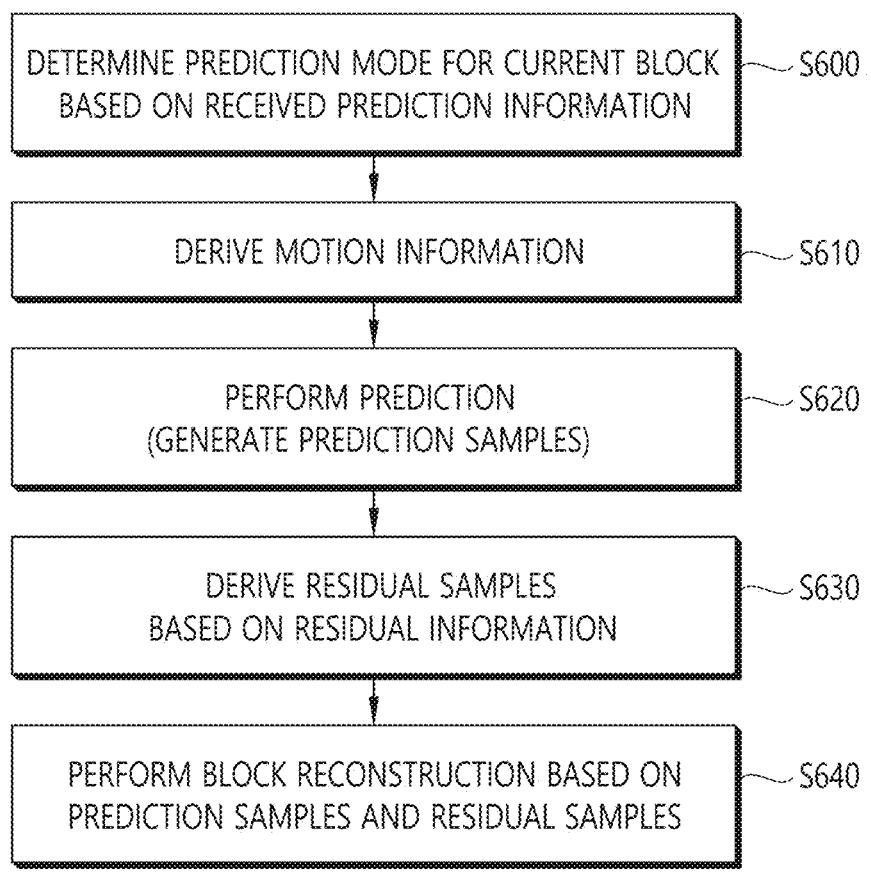
FIG. 6 is a flowchart illustrating an inter prediction-based block reconstructing method in a decoding apparatus.

FIG. 6 is a flowchart illustrating an inter prediction-based block reconstructing method in a decoding apparatus. The method of FIG. 6 may include steps S600, S610, S620, S630, and S640. The decoding apparatus may perform an operation corresponding to the operation performed by the encoding apparatus.

S600 to S620 may be performed by the inter predictor 332 of the decoding apparatus, and the prediction information of S600 and the residual information of S630 may be obtained from the bitstream by the entropy decoder 310 of the decoding apparatus. The residual processor 320 of the decoding apparatus may derive residual samples for the current block based on the residual information. Specifically, the dequantizer 321 of the residual processor 320 may derive transform coefficients by performing dequantization based on the quantized transform coefficients derived based on the residual information, and the inverse transformer 322 of the residual processor may derive residual samples for the current block by performing inverse transform on the transform coefficients. S640 may be performed by the adder 340 or the reconstructor of the decoding apparatus.

Specifically, the decoding apparatus may determine the prediction mode for the current block based on the received prediction information (S600). The decoding apparatus may determine which inter prediction mode is applied to the current block based on prediction mode information in the prediction information.

For example, it may be determined whether the merge mode is applied to the current block or whether the (A)MVP mode is determined based on the merge flag. Alternatively, one of various inter prediction mode candidates may be selected based on the mode index. The inter prediction mode candidates may include skip mode, merge mode, and/or (A)MVP mode, or may include various inter prediction modes to be described later.

The decoding apparatus derives motion information of the current block based on the determined inter prediction mode (S610). For example, when the skip mode or the merge mode is applied to the current block, the decoding apparatus may configure a merge candidate list to be described below and select one merge candidate from among the merge candidates included in the merge candidate list. The selection may be performed based on the aforementioned selection information (merge index). Motion information of the current block may be derived using the motion information of the selected merge candidate. The motion information of the selected merge candidate may be used as the motion information of the current block.

As another example, when the (A)MVP mode is applied to the current block, the decoding apparatus may construct an (A)MVP candidate list to be described below and use a motion vector of a selected mvp candidate, among motion vector predictor (mvp) candidates included in the (A)MVP candidate list, as the mvp of the current block. The selection may be performed based on the selection information (mvp flag or mvp index) described above. In this case, the MVD of the current block may be derived based on the information on the MVD, and a motion vector of the current block may be derived based on the mvp of the current block and the MVD. Also, the reference picture index of the current block may be derived based on the reference picture index information. A picture indicated by the reference picture index in the reference picture list for the current block may be derived as a reference picture referenced for inter prediction of the current block.

Meanwhile, as will be described below, the motion information of the current block may be derived without configuring a candidate list. In this case, the motion information of the current block may be derived according to a procedure disclosed in a prediction mode to be described later. In this case, the configuration of the candidate list as described above may be omitted.

The decoding apparatus may generate prediction samples for the current block based on the motion information of the current block (S620). In this case, the reference picture may be derived based on the reference picture index of the current block, and the prediction samples of the current block may be derived using samples of the reference block indicated by the motion vector of the current block on the reference picture. In this case, as described later, a prediction sample filtering procedure for all or some of the prediction samples of the current block may be further performed depending on the case.

For example, the inter predictor 332 of the decoding apparatus may include a prediction mode determiner, a motion information deriver, and a prediction sample deriver, and the prediction mode determiner may determine a prediction mode for the current block based on the received prediction mode information, the motion information deriver may derive motion information (a motion vector and/or a reference picture index, etc.) of the current block based on the received information on the motion information, and the prediction sample derivation unit may derive prediction samples of the current block.

The decoding apparatus generates residual samples for the current block based on the received residual information (S630). The decoding apparatus may generate reconstructed samples for the current block based on the prediction samples and the residual samples, and may derive a reconstructed block including the reconstructed samples (S640). A reconstructed picture for the current picture may be generated based on the reconstructed block.

Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In the present disclosure, some modes and/or motion information candidates derived by some modes may be included as one of motion information candidates of other modes. For example, an HMVP candidate may be added as a merge candidate in the merge/skip mode or may be added as an mvp candidate in the MVP mode.

Prediction mode information indicating the inter prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Meanwhile, information indicating whether the list0 (L0) prediction, the list1 (L1) prediction, or the bi-prediction described above is used in the current block (current coding unit) may be signaled in the current block. The information may be referred to as motion prediction direction information, inter prediction direction information or inter prediction indication information, and may be configured/encoded/signaled in the form of, for example, an inter_pred_idc syntax element. That is, the inter_pred_idc syntax element may indicate whether the aforementioned list0 (L0) prediction, list1 (L1) prediction, or bi-prediction is used for the current block (current coding unit). In the present disclosure, for the convenience of description, the inter prediction type (L0 prediction, L1 prediction, or BI prediction) indicated by the inter_pred_idc syntax element may be indicated as a motion prediction direction. L0 prediction may be represented as pred_L0, L1 prediction as pred_L1, and pair prediction as pred_BI. For example, the following prediction types may be determined according to the value of the inter_pred_idc syntax element.

TABLE 1

| | Name of inter_pred_idc | |
|---|---|---|
| inter_pred_idc | ( cbWidth + cbHeight ) != 8 | ( cbWidth + cbHeight ) = = 8 |
| 0 | PRED_L0 | PRED_L0 |
| 1 | PRED_L1 | PRED_L1 |
| 2 | PRED_BI | n.a. |

As described above, one picture may include one or more slices. The slice may have one of slice types including intra (I) slice, predictive (P) slice, and bi-predictive (B) slice. The slice type may be indicated based on slice type information. For blocks in an I slice, inter prediction may not be used for prediction and only intra prediction may be used. Of course, even in this case, the original sample value may be coded and signaled without prediction. Intra prediction or inter prediction may be used for blocks in a P slice, and only uni-prediction may be used when inter prediction is used. Meanwhile, intra prediction or inter prediction may be used for blocks in a B slice, and up to bi prediction may be used when inter prediction is used.

L0 and L1 may include reference pictures that are previously encoded/decoded prior to the current picture. For example, L0 may include reference pictures before and/or after the current picture in POC order, and L1 may include reference pictures after and/or before the current picture in POC order. In this case, L0 may be assigned a lower reference picture index relative to previous reference pictures in the POC order than the current reference pictures, and L1 may be assigned a lower reference picture index relative to previous reference pictures in the POC order than the current picture. In the case of B slice, bi-prediction may be applied, and in this case, unidirectional bi-prediction may be applied or bidirectional bi-prediction may be applied. The bidirectional bi-prediction may be called true bi-prediction.

As described above, a residual block (residual samples) may be derived based on a predicted block (prediction samples) derived through prediction at the encoding stage, and the residual samples are transformed/quantized by Residual information may be generated. The residual information may include information on quantized transform coefficients. The residual information may be included in video/image information, and the video/image information may be encoded and transmitted to a decoding apparatus in the form of a bitstream. The decoding apparatus may obtain the residual information from the bitstream, and may derive residual samples based on the residual information. Specifically, the decoding apparatus may derive quantized transform coefficients based on the residual information, and may derive residual blocks (residual samples) through an dequantization/inverse transform process.

Meanwhile, at least one process of the (inverse) transform and/or (de)quantization may be omitted Hereinafter, an in-loop filtering process performed for a reconstructed picture will be described. A modified reconstructed sample, block, picture (or modified filtered sample, block, picture) may be generated through the in-loop filtering process, and the modified (modified and filtered) reconstructed picture may be output as a decoded picture at the decoding apparatus and may also be stored in a decoded picture buffer or memory of the encoding apparatus/decoding apparatus and used as a reference picture in the inter prediction process at the time of encoding/decoding a picture later. The in-loop filtering process may include a deblocking filtering process, a sample adaptive offset (SAO) process, and/or an adaptive loop filter (ALF) process as described above. In this case, one or some of the deblocking filtering process, sample adaptive offset (SAO) process, adaptive loop filter (ALF) process, and bilateral filter process may be sequentially applied or all may be sequentially applied. For example, the SAO process may be performed after the deblocking filtering process is applied to the reconstructed picture. Or, for example, the ALF process may be performed after the deblocking filtering process is applied to the reconstructed picture. This may also be performed in the encoding apparatus.

Deblocking filtering is a filtering technique that removes distortion at boundaries between blocks in the reconstructed picture. The deblocking filtering process may, for example, derive a target boundary from the reconstructed picture, determine a boundary strength (bS) for the target boundary, and perform deblocking filtering on the target boundary based on the bS. The bS may be determined based on a prediction mode, a motion vector difference, whether a reference picture is the same, whether a non-zero significant coefficient exists, etc., of two blocks adjacent to the target boundary.

SAO is a method for compensating for an offset difference between the reconstructed picture and the original picture on a sample basis. For example, SAO may be applied based on a type such as a band offset, an edge offset, or the like. According to SAO, samples may be classified into different categories according to each SAO type, and an offset value may be added to each sample based on the category. The filtering information for SAO may include information on whether SAO is applied, SAO type information, and SAO offset value information. SAO may be applied to the reconstructed picture after the deblocking filtering is applied.

Adaptive Loop Filter (ALF) is a technique for filtering a reconstructed picture on a sample basis based on filter coefficients according to a filter shape. The encoding apparatus may determine whether to apply ALF, ALF shape and/or ALF filtering coefficient, etc. by comparing the reconstructed picture and the original picture and may signal to the decoding apparatus. That is, the filtering information for ALF may include information on whether ALF is applied, ALF filter shape information, ALF filtering coefficient information, and the like. ALF may be applied to the reconstructed picture after the deblocking filtering is applied.

Figure 7:
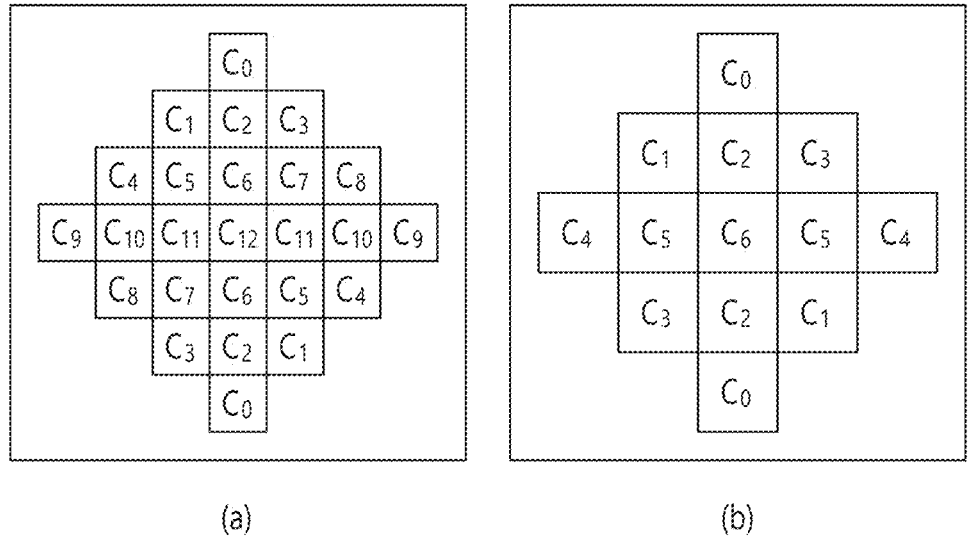
FIG. 7 shows an example of a shape of an ALF filter.

FIG. 7 shows an example of the shape of an ALF filter.

In FIG. 7, (a) shows a shape of a 7×7 diamond filter, (b) shows a shape of a 5×5 diamond filter. In FIG. 7, Cn in the filter shape represents a filter coefficient. When n in Cn is the same, this indicates that the same filter coefficients may be assigned. In the present disclosure, a position and/or unit to which filter coefficients are assigned according to a filter shape of the ALF may be referred to as a filter tab. In this case, one filter coefficient may be assigned to each filter tap, and an arrangement of the filter taps may correspond to a filter shape. A filter tab located at the center of the filter shape may be referred to as a center filter tab. The same filter coefficients may be assigned to two filter taps having the same n value existing at positions corresponding to each other with respect to the center filter tap. For example, in the case of a 7×7 diamond filter shape, 25 filter taps are included, and since filter coefficients C0 to C11 are assigned in a centrally symmetric form, filter coefficients may be assigned to the 25 filter taps using only 13 filter coefficients. Also, for example, in the case of a 5×5 diamond filter shape, 13 filter taps are included, and since filter coefficients C0 to C5 are assigned in a centrally symmetrical form, filter coefficients are assigned to the 13 filter taps using only 7 filter coefficients. For example, in order to reduce the data amount of information on signaled filter coefficients, 12 of 13 filter coefficients for the 7×7 diamond filter shape may be signaled (explicitly), and 1 filter coefficient may be (implicitly) derived. Also, for example, 6 of 7 filter coefficients for a 5×5 diamond filter shape may be signaled (explicitly) and 1 filter coefficient may be derived (implicitly).

According to an embodiment of the present disclosure, an ALF parameter used for the ALF process may be signaled through an adaptation parameter set (APS). The ALF parameter may be derived from filter information or ALF data for the ALF.

ALF is a type of in-loop filtering technique that may be applied in video/image coding as described above. ALF may be performed using a Wiener-based adaptive filter. This may be to minimize a mean square error (MSE) between original samples and decoded samples (or reconstructed samples). A high level design for an ALF tool may incorporate syntax elements accessible in the SPS and/or slice header (or tile group header).

In an example, before filtering for each 4×4 luma block, geometric transformations such as rotation or diagonal and vertical flipping may be applied to filter coefficients f(k, l) dependent on the gradient values calculated for the block and the corresponding filter clipping values c(k, l). This is equivalent to applying these transforms to the samples in the filter support area. Creating other blocks to which ALF is applied may be similar to arranging these blocks according to their directionality.

For example, three transformations, diagonal, vertical flip, and rotation may be performed based on the following equations.

$$\text{Diagonal: } f\_D(k, l) = f(l, k), \quad \text{[Equation 1]}$$
$$c\_D(k, l) = c(l, k)$$
$$\text{Vertical flip: } f\_V(k, l) = f(k, K - l - 1), \quad \text{[Equation 2]}$$
$$c\_V(k, l) = c(k, K - l - 1)$$
$$\text{Rotation: } f\_R(k, l) = f(K - l - 1, k), \quad \text{[Equation 3]}$$
$$c\_R(k, l) = c(K - l - 1, k)$$

In Equations 1 to 3, K may be a size of the filter. $0 \leq k$ and $l \leq K-1$ may be coefficients coordinates. For example, (0, 0) may be the top-left corner coordinate, and/or (K−1, K−1) may be the bottom-right corner coordinate. The relationship between the transformations and the four gradients in the four directions may be summarized in the following table.

TABLE 2

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

ALF filter parameters may be signaled in the APS and slice header. In one APS, up to 25 luma filter coefficients and clipping value indices may be signaled. In one APS, up to 8 chroma filter coefficients and clipping value indices may be signaled. In order to reduce bit overhead, filter coefficients of different classifications for the luma component may be merged. In the slice header, indices of APSs (referenced by the current slice) used for the current slice may be signaled.

The clipping value indices decoded from the APS may make it possible to determine clipping values using a luma table of clipping values and a chroma table of clipping values. These clipping values may be dependent on the internal bitdepth. More specifically, the luma table of clipping values and the chroma table of clipping values may be derived based on the following equations.

$$AlfClipL = \{\text{round}(2^{\wedge}(B(N-n+1)/N))\text{ for }n \in [1 \ldots N]\} \quad \text{[Equation 4]}$$

$$AlfClipC = \{\text{round}(2^{\wedge}((B-8)+8\ ((N-n))/(N-1)))\text{ for }n \in [1 \ldots N]\} \quad \text{[Equation 5]}$$

In the above equations, B may be an internal bit depth, and N may be the number of allowed clipping values (a predetermined number). For example, N may be 4.

In the slice header, up to 7 APS indices may be signaled to indicate luma filter sets used for the current slice. The filtering process may be further controlled at a CTB level. For example, a flag indicating whether ALF is applied to luma CTB may be signaled. Luma CTB may select one of the 16 fixed filter sets and filter sets from APSs. A filter set index may be signaled for luma CTB to indicate which filter set is applied. The 16 fixed filter sets may be predefined and hard-coded in both the encoder and decoder.

For the chroma component, the APS index may be signaled in the slice header to indicate the chroma filter sets used for the current slice. At the CTB level, when there are two or more chroma filter sets in the APS, a filter index may be signaled for each chroma CTB.

The filter coefficients may be quantized with 128 as the norm. To limit multiplication complexity, bitstream conformance may be applied so that coefficient values of non-central position may range from 0 to 28 and/or coefficient values of the remaining positions may be in the range from −27 to 27−1. Central position coefficient may not be signaled in the bitstream and may be pre-determined (considered) as 128.

When ALF is available for the current block, each sample R(i, j) may be filtered, and a filtered result R'(i, j) may be expressed by the following equation.

$$R'(i,j) = R(i,j) + \left(\left(\sum_{k \neq 0}\sum_{l \neq 0} f(k,l) \times K(R(i+k, j+l) - R(i,j), c(k,l)) + 64\right) \gg 7\right) \quad \text{[Equation 6]}$$

In the above equation, f(k, l) may be decoded filter coefficients, K(x, y) may be a clipping function, and c(k, l) may be decoded clipping parameters. For example, the variables k and/or l may vary from −L/2 to L/2. Here, L may represent a filter length. The clipping function K(x, y)=min (y, max(−y, x)) may correspond to the function Clip3(−y, y, x).

In an example, to reduce line buffer requirement of ALF, modified block classification and filtering may be applied for samples adjacent to horizontal CTU boundaries. For this purpose, virtual boundaries may be defined.

Figure 8:
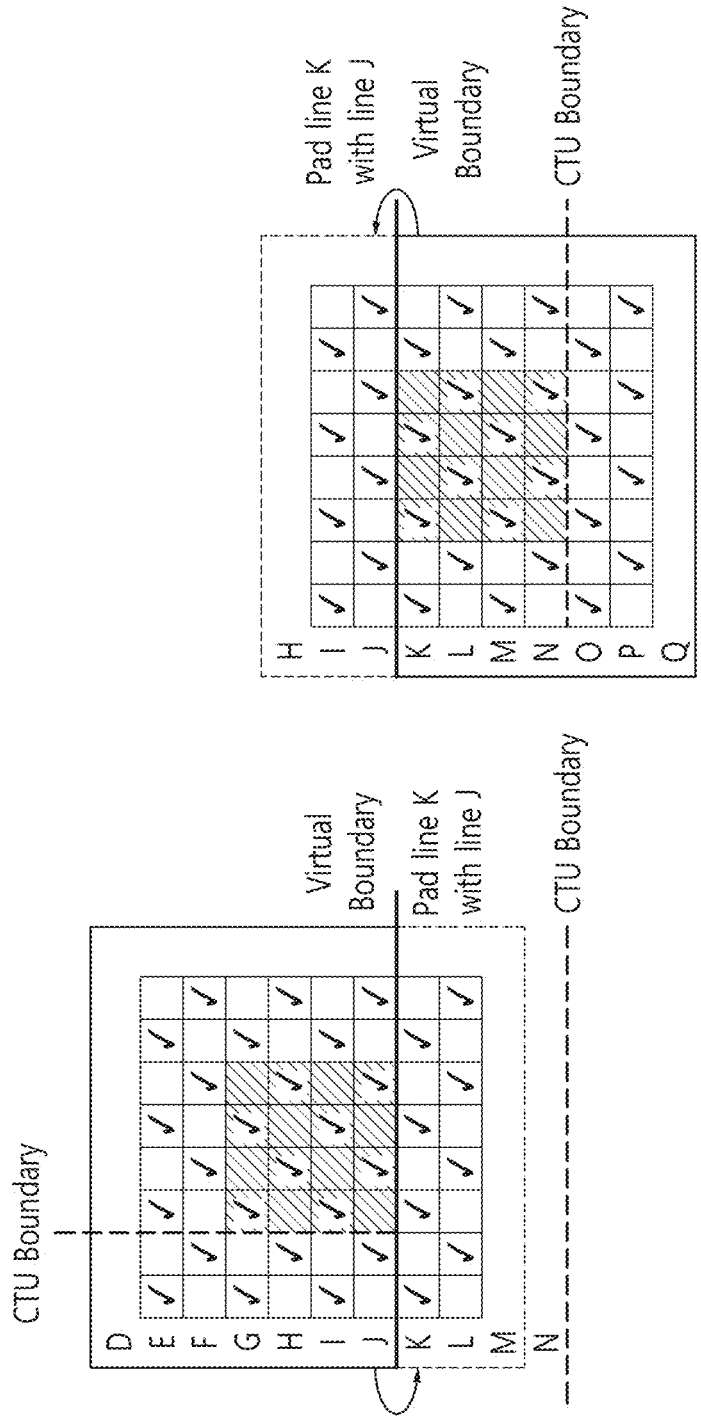
FIG. 8 is a diagram illustrating a virtual boundary applied to a filtering process according to an embodiment of the present disclosure.
Figure 9:
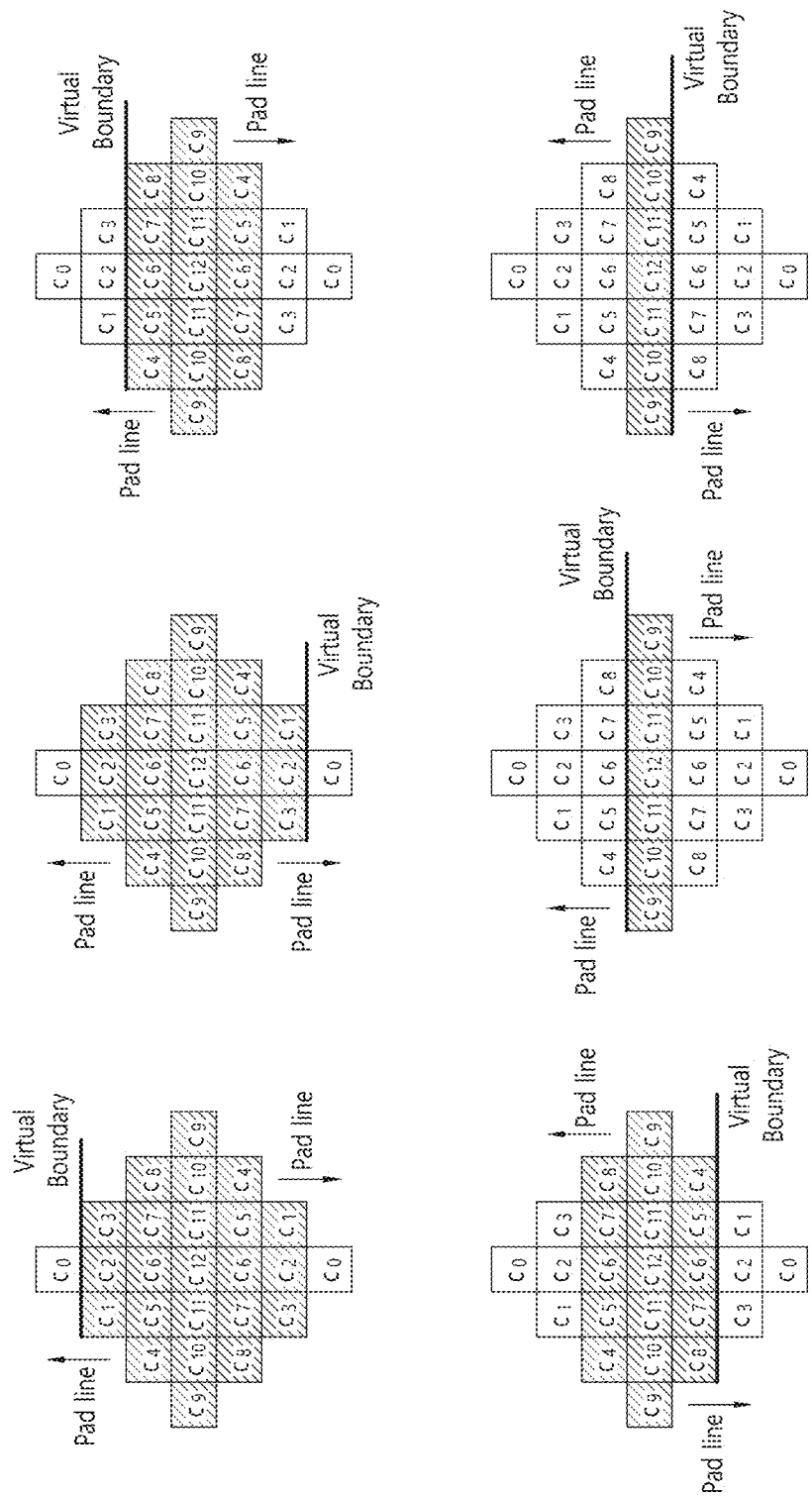
FIG. 9 illustrates an example of an ALF process using a virtual boundary according to an embodiment of the present disclosure.

FIG. 8 is a diagram illustrating a virtual boundary applied to a filtering process according to an embodiment of the present disclosure. FIG. 9 illustrates an example of an ALF process using a virtual boundary according to an embodiment of the present disclosure. FIG. 9 will be described in conjunction with FIG. 8.

Referring to FIG. 9, the virtual boundary may be a line defined by shifting the horizontal CTU boundary by N samples. In an example, N may be 4 for a luma component, and/or N may be 2 for a chroma component.

In FIG. 8, a modified block classification may be applied to the luma component. For 1D Laplacian gradient calculation of a 4×4 block on a virtual boundary, only samples above the virtual boundary may be used. Similarly, for calculating the 1D Laplacian gradient of a 4×4 block below the virtual boundary, only samples below the virtual boundary may be used. Quantization of an activity value A may be scaled accordingly, taking into account the reduced number of samples used in the 1D Laplacian gradient calculation.

For the filtering process, a symmetric padding operation at virtual boundaries may be used for the luma and chroma components. Referring to FIG. 8, when a filtered sample is located below the virtual boundary, neighboring samples located above the virtual boundary may be padded. Meanwhile, corresponding samples on the other side may also be symmetrically padded.

The process described according to FIG. 9 may also be used for boundaries of slices, bricks, and/or tiles when no filter is available across the boundaries. For ALF block classification, only samples contained in the same slice, brick, and/or tile may be used and the activity value may be scaled accordingly. For ALF filtering, symmetrical padding may be applied for each of the horizontal and/or vertical directions relative to the horizontal and/or vertical boundaries.

Figure 10:
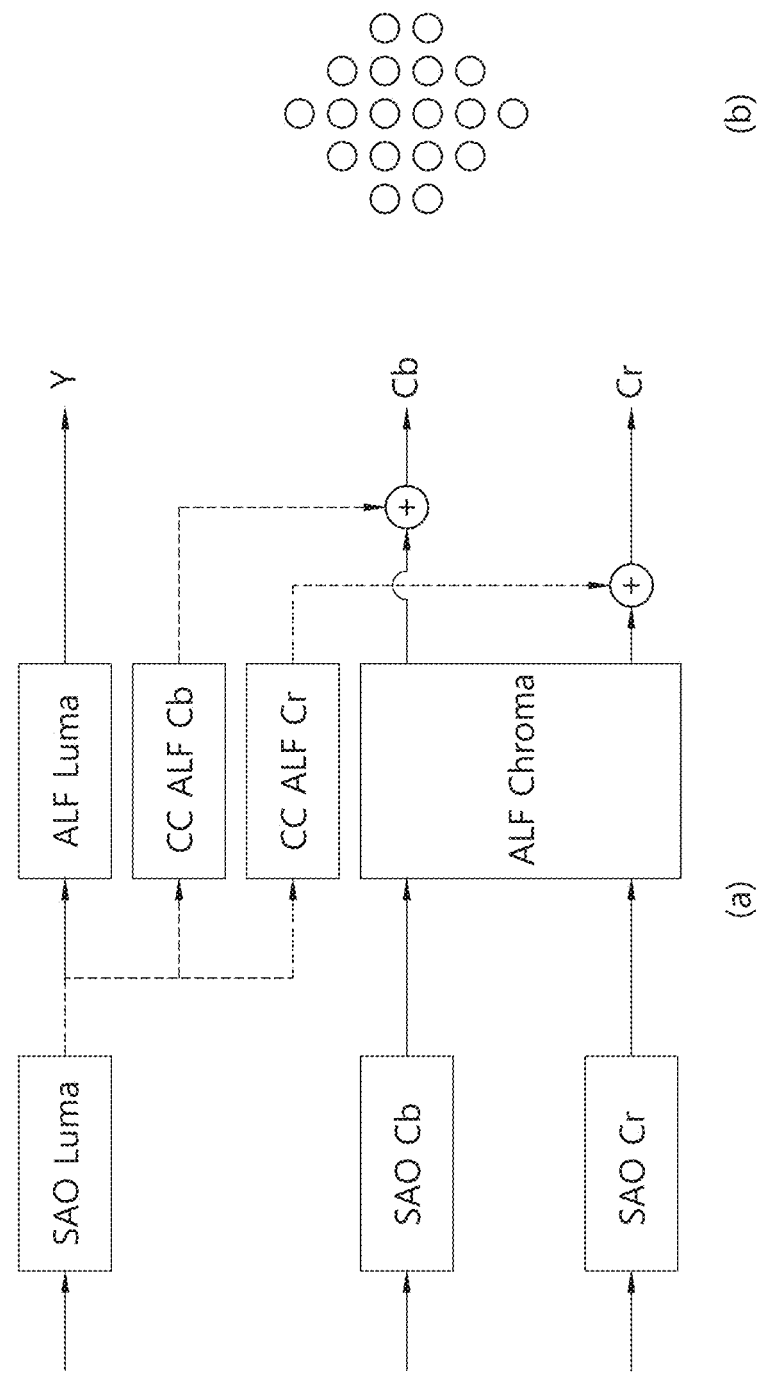
FIG. 10 is a diagram illustrating a cross-component adaptive loop filtering (CC-ALF (CCALF)) process according to an embodiment of the present disclosure.

FIG. 10 is a diagram illustrating a cross component adaptive loop filtering (CC-ALF) process according to an embodiment of the present disclosure. The CCALF process may be referred to as a cross-component filtering process.

In an aspect, the ALF process may include a general ALF process and a CCALF process. That is, the CCALF process may refer to some processes of the ALF procedure. In another aspect, the filtering process may include a deblocking process, a SAO process, an ALF process, and/or a CCALF process.

CC-ALF may refine each chroma component using luma sample values. CC-ALF is controlled by (image) information of a bitstream, which includes (a) information on filter coefficients for each chroma component and (b) information on a mask that controls filter application to blocks of samples. The filter coefficients may be signaled at the APS, and the block size and mask may be signaled at the slice level.

Referring to FIG. 10, the CC-ALF may operate by applying a linear diamond-shaped filter ((b) of FIG. 10) to the luma channel for each chroma component. The filter coefficients are transmitted to the APS, scaled by a factor of 210, and rounded up for a fixed point representation. Application of the filter may be controlled at a variable block size and signaled by a context coding flag received for blocks of each sample. The block size along with the CC-ALF-enabled flag may be received at the slice level for each chroma component. The block size (for chroma samples) may be 16×16, 32×32, 64×64, or 128×128.

In the embodiments below, a method of re-filtering or modifying reconstructed chroma samples filtered by the ALF based on the reconstructed luma samples is proposed.

An embodiment of the present disclosure relates to filter on/off transmission and filter coefficient transmission in CC-ALF. As described above, the information (syntax element) in the syntax table disclosed in the present disclosure may be included in the image/video information, may be configured/encoded in the encoding device and transmitted to the decoding device in the form of a bitstream. The decoding apparatus may parse/decode information (syntax element) in the corresponding syntax table. The decoding apparatus may perform a picture/image/video decoding process (specifically, for example, the CC-ALF process) based on the decoded information. Hereinafter, the same applies to other embodiments.

The following table shows some syntax of slice header information according to an embodiment of the present disclosure.

TABLE 3

| | Descriptor |
|---|---|
| slice_header( ) { | |
| ... | |
| if( sps_cross_component_alf_enabled_flag ) { | |
|    slice_cross_component_alf_cb_enabled_flag | u(1) |
|    if( slice_cross_component_alf_cb_enabled_flag ) { | |
|      slice_cross_component_alf_cb_reuse_temporal_layer_filter | u(1) |
|      if (!slice_cross_component_alf_cb_reuse_temporal_layer_filter) | |
|        slice_cross_component_alf_cb_aps_id | u(5) |
|        slice_cross_component_alf_cb_log2_control_size_minus4 | ue(v) |
|    } | |
|    slice_cross_component_alf_cr_enabled_flag | u(1) |
|    if( slice_cross_component_alf_cr_enabled_flag ) { | |
|      slice_cross_component_alf_ct_reuse_temporal_layer_filter | u(1) |
|      if (!slice_cross_component_alf_cr_reuse_temporal_layer_filter) | |
|        slice_cross_component_alf_cr_aps_id | u(5) |
|        slice_cross_component_alf_cr_log2_control_size_minus4 | ue(v) |
|    } | |
| } | |
| ... | |
| } | |

The following table shows exemplary semantics for the syntax elements included in the table above.

TABLE 4 slice_cross_component_alf_cb_enabled_flag equal to 0 specifies that the cross-component Cb filter is not applied to Cb colour component. slice_ cross_component_alf_cb_enabled_flag equal to 1 indicates that the cross-component Cb filter is applied to the Cb colour component.
slice_cross_component_alf_cr_enabled_flag equal to 0 specifies that the cross-component Cr filter is not applied to Cr colour component. slice_ cross_component_alf_cb_enabled_flag equal to 1 indicates that the cross-component Cr filter is applied to the Cr colour component.
slice_cross_component_alf_cb_reuse_temporal_layer_filter equal to 1 specifies that the cross-component Cb filter coefficients, with j=0..13, inclusive is set equal to AlfCCTemporalCoeff$_{Cb}$[ TemporalId ][ j ].
slice_cross_component_alf_cb_reuse_temporal_layer_filter equal to 0 and slice_cross_component_alf_cb_enabled_flag is equal to 1 specifies that the syntax element slice_cross_component_alf_cb_aps_id is present in slice header.
When slice_cross_component_alf_cb_enabled_flag is equal to 1, and slice_cross_component_alf_cb_reuse_temporal_layer_filter is equal to 0, the elements of AlfCCTemporalCoeff$_{Cb}$[ TemporalId ][ j ], with j = 0..13 are derived as follows:
AlfCCTemporalCoeff$_{Cb}$[ TemporalId ][ j ] =
AlfCCCoeff$_{Cb}$[ slice_cross_component_alf_cb_aps_id ][ j ]
slice_cross_component_alf_cr_reuse_temporal_layer_filter equal to 1 specifies that the cross-component Cr filter coefficients, with j=0..13, inclusive is set equal to AlfCCTemporalCoeff$_{Cr}$[ TemporalId ][ j ].
slice_cross_component_alf_cr_reuse_temporal_layer_filter equal to 0 and slicc_cross_component_alf_cr_enabled_flag is equal to 1 specifies that the syntax element slice_cross_component_alf_cr_aps_id is present in slice header.
When slice_cross_component_alf_cr_enabled_flag is equal to 1, and slice_cross_component_alf_cr_reuse_temporal_layer_filter is equal to 0, the elements of AlfCCTemporalCoeff$_{Cr}$[ TemporalId ][ j ], with j = 0..13 are derived as follows:
AlfCCTemporalCoeff$_{Cr}$[ TemporalId ][ j ] =
AlfCCCoeff$_{Cr}$[ slice_cross_component_alf_cr_aps_id ][ j ]
slice_cross_component_alf_cb_aps_id specifies the adaptation_parameter_set_id that the Cb colour component of the slice refers to for cross-component Cb filter. When slice_cross_component_alf_cb_aps_id is not present, it is inferred to be equal to slice_alf_aps_id_luma[ 0 ]. The TemporalId of the ALF APS NAL unit having adaptation_parameter_set_id equal to slice_cross_component_alf_cb_aps_id shall be less than or equal to the TemporalId of the coded slice NAL unit.
slice_cross_component_alf_cr_aps_id specifies the adaptation_parameter_set_id that the Cr colour component of the slice refers to for cross-component Cr filter. When slice_cross_component_alf_cr_aps_id is not present, it is inferred to be equal to slice_alf_aps_id_luma[ 0 ]. The TemporalId of the ALF APS NAL unit having adaptation_parameter_set_id equal to slice_cross_component_alf_cr_aps_id shall be less than or equal to the TemporalId of the coded slice NAL unit.
slice_cross_component_alf_cb_log2_control_size_minus4 specifies the value of the square block sizes in number of samples as follows:
AlfCCSamplesCbW = AlfCCSamplesCbH = $2^{(slice\_cross\_component\_alf\_cb\_log2\_control\_size\_minus4 + 4)}$
slice_cross_component_alf_cb_log2_control_size_minus4 shall be in the range 0 to 3, inclusive.
slice_cross_component_alf_cr_log2_control_size_minus4 specifies the value of the square block TABLE 4-continued sizes in number of samples as follows:
AlfCCSamplesCrW = AlfCCSamplesCrH = $2^{(\text{slice\_cross\_component\_alf\_cr\_log2\_control\_size\_minus4} + 4)}$
slice_cross_component_alf_cr_log2_control_size_minus4 shall be in the range 0 to 3, inclusive.

Referring to the above two tables, when sps_cross_component_alf_enabled_flag is 1 in the slice header, parsing of slice_cross_component_alf_cb_enabled_flag may be performed to determine whether Cb CC-ALF is applied in the slice. When slice_cross_component_alf_cb_enabled_flag is 1, CC-ALF is applied to the corresponding Cb slice, and when slice_cross_component_alf_cb_reuse_temporal_layer_filter is 1, the filter of the same existing temporal layer may be reused. When slice_cross_component_alf_cb_enabled_flag is 0, CC-ALF may be applied using a filter in the corresponding adaptation parameter set (APS) id through slice_cross_component_alf_cb_aps_id parsing. Slice_cross_component_alf_cb_log 2_control_size_minus4 may mean a CC-ALF applied block unit in Cb slice.

For example, when the value of slice_cross_component_alf_cb_log 2_control_size_minus4 is 0, whether CC-ALF is applied is determined in units of 16×16. When the value of slice_cross_component_alf_cb_log 2_control_size_minus4 is 1, whether CC-ALF is applied is determined in units of 32×32. When the value of slice_cross_component_alf_cb_log 2_control_size_minus4 is 2, whether CC-ALF is applied is determined in units of 64×64. When the value of slice_cross_component_alf_cb_log 2_control_size_minus4 is 3, whether CC-ALF is applied is determined in units of 128×128. In addition, the syntax of the same structure as above is used for Cr CC-ALF.

The following table shows example syntax for ALF data.

TABLE 5

|  | Descriptor |
|---|---|
| alf_data( adaptation_parameter_set_id ) { |  |
| ... |  |
|   if (sps_cross_component_alf_enabled_flag) { |  |

TABLE 5-continued

|  | Descriptor |
|---|---|
|     alf_cross_component_cb_filter_signal_flag | u(1) |
|     alf_cross_component_cr_filter_signal_flag | u(1) |
|   } |  |
|   if( alf_luma_filter_signal_flag ) { |  |
|     ... |  |
|   } |  |
|   if( alf_chroma_filter_signal_flag ) { |  |
|     ... |  |
|   } |  |
|   if( alf_cross_component_cb_filter_signal_flag ) { |  |
|     alf_cross_component_cb_min_eg_order_minus1 | ue(v) |
|     for( i = 0; i < 3; i++ ) |  |
|       alf_cross_component_cb_eg_order_increase_flag[ i ] | u(1) |
|     for ( j = 0; j < 14; j++ ) { |  |
|       alf_cross_component_cb_coeff_abs[ j ] | uek(v) |
|       if( alf_cross_component_cb_coeff_abs[ j ] ) |  |
|         alf_cross_component_cb_coeff_sign[ j ] | u(1) |
|     } |  |
|   } |  |
|   if( alf_cross_component_cr_filter_signal_flag ) { |  |
|     alf_cross_component_cr_min_eg_order_minus1 | ue(v) |
|     for( i = 0; i < 3; i++ ) |  |
|       alf_cross_component_cr_eg_order_increase_flag[ i ] | u(1) |
|     for ( j = 0; j < 14; j++ ) { |  |
|       alf_cross_component_cr_coeff_abs[ j ] | uek(v) |
|       if( alf_cross_component_cr_coeff_abs[ j ] ) |  |
|         alf_cross_component_cr_coeff_sign[ j ] | u(1) |
|     } |  |
|   } |  |
| } |  |

The following table exemplary semantics for the syntax elements included in the above table.

TABLE 6 alf_luma_filter_signal_flag equal to 1 specifies that a luma filter set is signalled.
alf_luma_filter_signal_flag equal to 0 specifies that a luma filter set is not signalled. When
alf_luma_filter_signal_flag is not present, it is inferred to be equal 0.
alf_chroma_filter_signal_flag equal to 1 specifies that a chroma filter is signalled.
alf_chroma_filter_signal_flag equal to 0 specifies that a chroma filter is not signalled. When
alf_chroma_filter_signal_flag is not present, it is inferred to be equal 0.
alf_cross_component_cb_filter_signal_flag equal to 1 specifies that a cross-component Cb filter
set is signalled. alf_cross_component_cb_filter_signal_flag equal to 0 specifies that a cross-
component Cb filter set is not signalled. When alf_cross_component_cb_filter_signal_flag is not
present, it is inferred to be equal 0.
alf_cross_component_cr_filter_signal_flag equal to 1 specifies that a cross-component Cr filter set
is signalled. alf_cross_component_cb_filter_signal_flag equal to 0 specifies that a cross-component
Cr filter set is not signalled. When alf_cross_component_cr_filter_signal_flag is not present, it is
inferred to be equal 0.
alf_cross_component_cb_min_eg_order_minus1 plus 1 specifies the minimum order of the exp-
Golomb code for cross-component Cb filter coefficient signalling. The value of
alf_cross_component_cb_min_eg_order_minus1 shall be in the range of 0 to 9, inclusive.
alf_cross_component_cr_min_eg_order_minus1 plus 1 specifies the minimum order of the exp-
Golomb code for cross-component Cr filter coefficient signalling. The value of
alf_cross_component_cb_min_eg_order_minus1 shall be in the range of 0 to 9, inclusive.
alf_cross_component_cb_eg_order_increase_flag[ i ] equal to 1 specifies that the minimum order
of the exp-Golomb code for cross-component Cb filter coefficient signalling is incremented by 1.
alf_cross_component_cb_eg_order_increase_flag[ i ] equal to 0 specifies that the minimum order of
the exp-Golomb code for cross-component Cb filter coefficient signalling is not incremented by 1.
The order expGoOrderCb[ i ] of the exp-Golomb code used to decode the values of
alf_cross_component_cb_coeff_abs[ j ] is derived as follows:
expGoOrderCb[ i ] = ( i = = 0 ? alf_cross_component_cb_min_eg_order_minus1 + 1 :

TABLE 6-continued expGoOrderCb[ i − 1 ] ) + alf_cross_component_cb_eg_order_increase_flag[ i ]
alf_cross_component_cr_eg_order_increase_flag[ i ] equal to 1 specifies that the minimum order
of the exp-Golomb code for cross-component Cr filter coefficient signalling is incremented by 1.
alf_cross_component_cr_eg_order_increase_flag[ i ] equal to 0 specifies that the minimum order of
the exp-Golomb code for cross-component Cr filter coefficient signalling is not incremented by 1.
The order cxpGoOrderCr[ i ] of the exp-Golomb code used to decode the values of
alf_cross_component_cb_coeff_abs[ j ] is derived as follows:
expGoOrderCr[ i ] = ( i = = 0 ? alf_cross_component_cr_min_eg_order_minus1 + 1 :
expGoOrderCr[ i − 1 ] ) + alf_cross_component_cr_eg_order_increase_flag[ i ]
alf_cross_component_cb_coeff_abs[ j ] specifies the absolute value of the j-th coefficient of the
signalled cross-component Cb filter. When alf_cross_component_cb_coeff_abs[ j ] is not present, it
is inferred to be equal 0.
The order k of the exp-Golomb binarization uek(v) is derived as follows:
golombOrderIdxCb[ ] = {0,2,2,2,1,2,2,2,2,2,2,1,2,1} [these may be Categorize coefficient into 3
categories, each category uses the same order k exp-Golomb code]
k = expGoOrderCb[ golombOrderIdxCb[ j ] ]
alf_cross_component_cr_coeff_abs[ j ] specifies the absolute value of the j-th coefficient of the
signalled cross-component Cr filter. When alf_cross_component_cr_coeff_abs[ j ] is not present, it
is inferred to be equal 0.
The order k of the exp-Golomb binanzation uek(v) is derived as follows:
golombOrderIdxCr[ ] = {0,1,2,1,0,1,2,2,2,2,2,1,2,1}[these may be Categorize coefficient into 3
categories, each category uses the same order k exp-Golomb code]
k = expGoOrderCr[ golombOrderIdxCr[ j ] ]
alf_cross_component_cb_coeff_sign[ j ] specifies the sign of the j-th cross-component Cb filter
coefficient as follows:
- If alf_cross_component_cb_coeff_sign[ j ] is equal to 0, the corresponding cross-component
  Cb filter coefficient has a positive value.
- Otherwise (alf_cross_component_cb_coeff_sign[ j ] is equal to 1), the corresponding cross-
  component Cb filter coefficient has a negative value.
When alf_cross_component_cb_coeff_sign[ j ] is not present, it is inferred to be equal to 0.
The cross-component Cb filter coefficients AlfCCCoeff$_{Cb}$[ adaptation_parameter_set_id ] with
elements AlfCCCoeff$_{Cb}$[ adaptation_parameter_set_id ][ j ], with j = 0..13 are derived as follows:
AlfCCCoeff$_{Cb}$[ adaptation_parameter_set_id ][ j ] = alf_cross_component_cb_coeff_abs[ j ] *
  ( 1 − 2 * alf_cross_component_cb_coeff_sign[ j ] )
It is a requirement of bitstream conformance that the values of
AlfCCCoeff$_{Cb}$[ adaptation_parameter_set_id ][ j ] with j = 0..13 shall be in the range of $-2^{10} - 1$ to
$2^{10} - 1$, inclusive.
alf_cross_component_cr_coeff_sign[ j ] specifies the sign of the j-th cross-component Cr filter
coefficient as follows:
- If alf_cross_component_cr_coeff_sign[ j ] is equal to 0, the corresponding cross-component
  Cr filter coefficient has a positive value.
- Otherwise (alf_cross_component_cr_coeff_sign[ j ] is equal to 1), the corresponding cross-
  component Cr filter coefficient has a negative value.
When alf_cross_component_cr_coeff_sign[ j ] is not present, it is inferred to be equal to 0.
The cross-component Cr filter coefficients AlfCCCoeff$_{Cr}$[ adaptation_parameter_set_id ] with
elements AlfCCCoeff$_{Cr}$[ adaptation_parameter_set_id ][ j ], with j = 0..13 are derived as follows:
AlfCCCoeff$_{Cr}$[ adaptation_parameter_set_id ][ j ] = alf_cross_component_cr_coeff_abs[ j ] *
  ( 1 − 2 * alf_cross_component_cr_coeff_sign[ j ] )
It is a requirement of bitstream conformance that the values of
AlfCCCoeff$_{Cr}$[ adaptation_parameter_set_id ][ j ] with j = 0..13 shall be in the range of $-2^{10} - 1$ to
$2^{10} - 1$, inclusive.
TemporalId is the temporal identifier of the current NAL unit Referring to the above two tables, the CC-ALF syntax elements do not follow the existing (general) ALF syntax structure but are transmitted independently and are configured to be independently applied. That is, CC-ALF may be applied even when the ALF tool on the SPS is off. A new hardware pipeline design is required because CC-ALF should be able to operate independently of the existing ALF structure. This causes an increase in the cost of hardware implementation and an increase in hardware delay.

In addition, in the ALF, whether both luma and chroma images are applied is determined in units of CTUs, and a result of the determination is transmitted to the decoder through signaling. However, whether variable CC-ALF is applied is determined in units of 16×16 to 128×128, and this application may cause a collision between the existing ALF structure and CC-ALF. This causes problems in hardware implementation and at the same time causes an increase in line buffers for various variable CC-ALF applications.

In the present disclosure, the above-mentioned problems in hardware implementation of CC-ALF is solved by integrally applying the CC-ALF syntax structure to the ALF syntax structure.

According to an embodiment of the present disclosure, in order to determine whether CC-ALF is used (applied), a sequence parameter set (SPS) may include a CC-ALF enable flag (sps_ccalf_enable_flag). The CC-ALF enabled flag may be transmitted independently of an ALF enabled flag (sps_alf_enabled_flag) for determining whether ALF is used (applied).

The following table shows some of the exemplary syntax of the SPS according to the present embodiment.

TABLE 7

| ... | |
|---|---|
| sps_weighted_bipred_flag | u(1) |
| sps_sao_enabled_flag | u(1) |
| sps_alf_enabled_flag | u(1) |
| if( sps_alf_enabled_flag ) | |
|     sps_ccalf_enabled_flag | u(1) |
| ... | u(1) |

Referring to the above table, CC-ALF may be applied only when ALF is always operating. That is, only when the ALF-enabled flag (sps_alf_enabled_flag) is 1, the CC-ALF-enabled flag (sps_ccalf_enabled_flag) may be parsed. CC-ALF and ALF may be combined according to the table above. The CC-ALF-enabled flag may indicate whether (and may be related to) whether CC-ALF is available.

The following table shows some of the example syntax for slice headers.

TABLE 8

| | Descriptor |
|---|---|
| slice_header( ) { | |
| ... | |
|   if( sps_alf_enabled_flag ) { | |
|     slice_alf_enabled flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|     if( sps_ccalf_enabled_flag ) { | |
|       slice_cross_component_alf_cb_enabled_flag | u(1) |
|       if( slice_cross_component_alf_cb_enabled_flag ) { | |
|         slice_cross_component_alf_cb_reuse_temporal_layer_filter | u(1) |
|         if (!slice_cross_component_alf_cb_reuse_temporal_layer_filter) | |
|           slice_cross_component_alf_cb_aps_id | u(5) |
|         slice_cross_component_alf_cb_log2_control_size_minus4 | ue(v) |
|       } | |
|       slice_cross_component_alf_cr_enabled_flag | u(1) |
|       if( slice_cross_component_alf_cr_enabled_flag ) { | |
|         slice_cross_component_alf_ct_reuse_temporal_layer_filter | u(1) |
|         if (!slice_cross_component_alf_cr_reuse_temporal_layer_filter) | |
|           slice_cross_component_alf_cr_aps_id | u(5) |
|         slice_cross_component_alf_cr_log2_control_size_minus4 | ue(v) |
|       } | |
|     } | |
|   } | |
| ... | |

Referring to the above table, parsing of sps_ccalf_enabled_flag may be performed only when sps_alf_enabled_flag is 1. The syntax elements included in the table may be described based on Table 4. In an example, image information encoded by the encoding device or obtained (received) by the decoding device may include slice header information (slice_header( )). Based on a determination that the value of the CCALF-enabled flag (sps_ccalf_flag) is 1, the slice header information includes a first flag (slice_cross_component_alf_cb_enabeld_flag) related to whether CC-ALF is available for the Cb color component of the filtered reconstructed chroma samples and a second flag (slice_cross_component_alf_cr_enabeld_flag) related to whether CC-ALF is available for the Cr color component of the filtered reconstructed chroma samples.

In an example, based on the determination that the value of the first flag (slice_cross_component_alf_cb_enabeld_flag) is 1, the slice header information may include ID information (slice_cross_component_alf_cb_aps_id) of the first APS for deriving cross-component filter coefficients for the Cb color component. Based on the determination that the value of the second flag (slice_cross_component_alf_cr_enabeld_flag) is 1, the slice header information may include ID information (slice_cross_componen-t_alf_cr_aps_id) of the second APS for deriving cross-component filter coefficients for the Cr color component.

The following table shows a portion of SPS syntax according to another example of the present embodiment.

TABLE 9

| | |
|---|---|
| ... | |
| sps_weighted_bipred_flag | u(1) |
| sps_sao_enabled_flag | u(1) |
| sps_alf_enabled_flag | u(1) |
| if( ChromaArrayType != 0 && sps_alf_enabled_flag ) | |
|   sps_ccalf_enabled_flag | u(1) |
| ... | u(1) |

The following table exemplarily shows a portion of the slice header syntax.

TABLE 10

| | Descriptor |
|---|---|
| slice_header( ) { | |
|   ... | |
|   if( sps_alf_enabled_flag ) { | |
|     slice_alf_enabled_flag | u(1) |
|     if( slice_alf_enabled_flag ) { | |

TABLE 10-continued

| | Descriptor |
|---|---|
| slice_num_alf_aps_ids_luma | u(3) |
|   for( i = 0; i < slice_num_alf_aps_ids_luma; i++ ) | |
|     slice_alf_aps_id_luma[ i ] | u(3) |
|   if( ChromaArrayType != 0 ) | |
|     slice_alf_chroma_idc | u(2) |
|   if( slice_alf_chroma_idc ) | |
|     slice_alf_aps_id_chroma | u(3) |
| } | |
| if( ChromaArrayType != 0 && sps_ccalf_enabled_flag ) { | |
|   slice_cross_component_alf_cb_enabled_flag | u(1) |
|   if( slice_cross_component_alf_cb_enabled_flag ) { | |
|     slice_cross_component_alf_cb_reuse_temporal_layer_filter | u(1) |
|     if (!slice_cross_component_alf_cb_reuse_temporal_layer_filter) | |
|       slice_cross_component_alf_cb_aps_id | u(5) |
|     slice_cross_component_alf_cb_log2_control_size_minus4 | ue(v) |
|   } | |
|   slice_cross_component_alf_cr_enabled_flag | u(1) |
|   if( slice_cross_component_alf_cr_enabled_flag ) { | |
|     slice_cross_component_alf_ct_reuse_temporal_layer_filter | u(1) |
|     if(!slice_cross_component_alf_cr_reuse_temporal_layer_filter) | |
|       slice_cross_component_alf_cr_aps_id | u(5) |
|     slice_cross_component_alf_cr_log2_control_size_minus4 | ue(v) |
|   } | |
|  } | |
| } | |
| ... | |

Referring to Table 9, when the ChromaArrayType is not 0 and the ALF-enabled flag (sps_alf_enabled_flag) is 1, the SPS may include the CCALF-enabled flag (sps_ccalf_enabled_flag). For example, if ChromaArrayType is not 0, the chroma format may not be monochrome, and a CCALF-enabled flag may be transmitted through the SPS based on the case where the chroma format is not monochrome.

Referring to Table 9, based on the case where ChromaArrayType is not 0, information on CCALF (slice_cross_component_alf_cb_enabled_flag, slice_cross_component_alf_cb_aps_id, slice_cross_component_alf_cr_enabled_flag, slice_cross_component_alf_cr) may be included in the slice header information.

In an example, image information encoded by the encoding device or obtained by the decoding device may include the SPS. The SPS may include a first ALF-enabled flag (sps_alf_enabled_flag) related to whether ALF is available. For example, based on a determination that the value of the first ALF-enabled flag is 1, the SPS may include a CCALF-enabled flag related to whether the cross-component filtering is available. In another example, if sps_ccalf_enabled_flag is not used and sps_alf_enabled_flag is 1, CCALF may be always applied (sps_ccalf_enabled_flag==1).

The following table shows a portion of slice header syntax according to another example of this embodiment.

TABLE 11

| | Descriptor |
|---|---|
| slice_header( ) { | |
|   ... | |
|   if( sps_alf_enabled_flag ) { | |
|     slice_alf_enabled_flag | u(1) |
|     if( slice_alf_enabled_flag ) { | |

TABLE 11-continued

| | Descriptor |
|---|---|
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|     if(sps_ccalf_enabled_flag ) { | |
|       slice_ccalf_enabled_flag | u(1) |
|       if( slice_ccalf_enabled_flag ) { | |
|         if( ChromaArrayType != 0 ) | |
|           slice_ccalf_chroma_idc | u(2) |
|         if( slice_ccalf_chroma_idc ) | |
|           slice_ccalf_aps_id_chroma | u(3) |
|       } | |
|     } | |
|   } | |
| ... | |

Referring to the above table, parsing of the CCALF enabled flag (sps_ccalf_enabled_flag) may be performed only when the ALF enabled flag (sps_alf_enabled_flag) is 1.

The following table shows exemplary semantics for the syntax elements included in the above table.

TABLE 12 slice_ccalf_enabled_flag equal to 1 specifies that cross component adaptive loop filter is enabled and
may be applied to Cb. or Cr colour component in a slice. slice_ccalf_enabled_flag equal to 0 specifies that
cross component adaptive loop filter is disabled for all colour components in a slice.
 slice_ccalf_chroma_idc equal to 0 specifies that the cross component adaptive loop filter is not applied
to Cb and Cr colour components. slice_ccalf_chroma_idc equal to 1 indicates that the cross component adaptive
loop filter is applied to the Cb colour component. slice_ccalf_chroma_idc equal to 2 indicates that the cross
component adaptive loop filter is applied to the Cr colour component. slice_ccalf_chroma_idc equal to 3
indicates that the cross component adaptive loop filler is applied to Cb and Cr colour components. When
slice_ccalf_chroma_idc is not present. it is inferred to be equal to 0.
 slice_ccalf_aps_id_chroma specifies the adaptation_parameter_set_id of the CCALF APS that the
chroma component of the slice refers to. The TemporalId of the APS NAL unit having aps_params_type equal
to CC_ALF_APS and adaptation parameter set id equal to slice_ccalf_aps_id_chroma shall be less than or
equal to the TemporalId of the coded slice NAL unit.
 For intra slices and slices in an IRAP picture, slice_ccalf_aps_id_chroma shall not refer to an CCALF
APS associated with other pictures rather than the picture containing the intra slices or the IRAP picture.

slice_ccalf_chroma_idc of the above table may be described by the semantics of the table below.

TABLE 13 slice_ccalf_chroma_idc equal to 0 indicates that the cross component adaptive loop filter is applied to
the Cb colour component. slice_ccalf_chroma_idc equal to 1 indicates that the cross component adaptive loop
filter is applied to the Cr colour component. slice_ccalf_chroma_idc equal to 2 indicates that the cross
component adaptive loop filter is applied to Cb and Cr colour components. When slice_ccalf_chroma_idc is
not present, it is inferred to be equal to 0.

The following table shows a portion of slice header syntax according to another example of this embodiment.

TABLE 14

| | Descriptor |
|---|---|
| slice_header( ) { | |
|  ... | |
|  if( sps_alf_enabled_flag ) { | |
|   slice_alf_enabled_flag | u(1) |
|   if( slice_alf_enabled_flag ) { | |
|    slice_num_alf_aps_ids_luma | u(3) |
|    for( i = 0; i < slice_num_alf_aps_ids_luma; i++ ) | |
|     slice_alf_aps_id_luma[ i ] | u(3) |
|    if( ChromaArrayType != 0 ) | |
|     slice_alf_chroma_idc | u(2) |
|    if( slice_alf_chroma_idc ) | |
|     slice_alf_aps_id_chroma | u(3) |
|   } | |
|  if( ChromaArrayType != 0 && sps_ccalf_enabled_flag ) { | |
|   slice_ccalf_enabled_flag | u(1) |
|   if( slice_ccalf_enabled_flag ) { | |
|    slice_ccalf_chroma_idc | u(2) |
|    if( slice_ccalf_chroma_idc ) | |
|     slice_ccalf_aps_id_chroma | u(3) |
|   } | |
|  } | |
| } | |
| ... | |

The syntax elements included in the table may be described according to Table 12 or Table 13. In addition, when the chroma format is not monochrome, CCALF-related information may be included in the slice header.

The following table shows a portion of slice header syntax according to another example of this embodiment.

TABLE 15

| | Descriptor |
|---|---|
| slice_header( ) { | |
|  ... | |
|  if( sps_alf_enabled_flag ) { | |
|   slice_alf_enabled_flag | u(1) |
|   if( slice_alf_enabled_flag ) { | |
|    slice_num_alf_aps_ids_luma | u(3) |
|    for( i = 0; i < slice_num_alf_aps_ids_luma; i++ ) | |
|     slice_alf_aps_id_luma[ i ] | u(3) |
|    if( ChromaArrayType != 0 ) | |
|     slice_alf_chroma_idc | u(2) |
|    if( slice_alf_chroma_idc ) | |
|     slice_alf_aps_id_chroma | u(3) |
|  } | |
|  if(sps_ccalf_enabled_flag ) { | |
|   if( ChromaArrayType != 0 ) { | |
|    slice_ccalf_chroma_idc | u(2) |
|    if( slice_ccalf_chroma_idc ) | |
|     slice_ccalf_aps_id_chroma | u(3) |
|   } | |
|  } | |
| } | |
| ... | |

The following table shows exemplary semantics for the syntax elements included in the above table.

TABLE 16 slice_ccalf_chroma_idc equal to 0 specifies that the cross component adaptive loop filter is not applied
to Cb and Cr colour components. slice_ccalf_chroma_idc equal to 1 indicates that the cross component adaptive
loop filter is applied to the Cb colour component. slice_ccalf_chroma_idc equal to 2 indicates that the cross
component adaptive loop filter is applied to the Cr colour component. slice_ccalf_chroma_idc equal to 3

TABLE 16-continued indicates that the cross component adaptive loop filter is applied to Cb and Cr colour components. When slice_ccalf_chroma_idc is not present, it is inferred to be equal to 0.

slice_ccalf_aps_id_chroma specifies the adaptation_parameter_set_id of the CCALF APS that the chroma component of the slice refers to. The TemporalId of the APS NAL unit having aps_params_type equal to CC_ALF_APS and adaptation_parameter_set_id equal to slice_ccalf_aps_id_chroma shall be less than or equal to the TemporalId of the coded slice NAL unit.

For intra slices and slices in an IRAP picture, slice_ccalf_aps_id_chroma shall not refer to an CCALF APS associated with other pictures rather than the picture containing the intra slices or the IRAP picture.

The following table shows a portion of slice header syntax according to another example of this embodiment. The syntax elements included in the following table may be described according to Table 12 or Table 13.

TABLE 17

|  | Descriptor |
|---|---|
| slice_header( ) { | |
| ... | |
| if( sps_alf_enabled_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ){ | |
|       slice_alf_chroma_idc | u(2) |
|     if(sps_ccalf_enabled_flag ) | |
|       slice_ccalf_chroma_idc | u(2) |
|   } | |
|   if( slice_alf_chroma_idc ) | |
|     slice_alf_aps_id_chroma | u(3) |
|   if( slice_ccalf_chroma_idc ) | |
|     slice_ccalf_aps_id_chroma | u(3) |
|   } | |
| } | |
| ... | |

Referring to the above table, whether slice unit ALF and CC-ALF are applied may be determined at once through slice_alf_enabled_flag. After parsing slice_alf_chroma_idc, when the first ALF-enabled flag (sps_alf_enabled_flag) is 1, slice_ccalf_chroma_idc may be parsed.

Referring to the above table, whether sps_ccalf_enabeld_flag is 1 in slice header information may be determined only when slice_alf_enabled_flag is 1. The slice header information may include a second ALF-enabled flag (slice_alf_enabled_flag) related to whether ALF is available. Based on a determination that the value of the second ALF enabled flag (slice_alf_enabled_flag) is 1, the CCALF may be available for the slice.

The following table exemplarily shows a portion of the APS syntax. The syntax element adaptation_parameter_set_id may indicate identifier information (ID information) of the APS.

TABLE 18

|  | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
| ... | |

The following table shows example syntax for ALF data.

TABLE 19

|  | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     ... | |
|   } | |
|   if( alf_chroma_filter_signal_flag ) { | |
|     ... | |
|   } | |
|   if( alf_cross_component_cb_filter_signal_flag ) { | |
|     alf_cross_component_cb_min_eg_order_minus1 | ue(v) |
|     for( i = 0; i < 3; i++ ) | |
|       alf_cross_component_cb_eg_order_increase_flag[ i ] | u(1) |
|     for ( j = 0; j < 14; j++ ) { | |
|       alf_cross_component_cb_coeff_abs[ j ] | uek(v) |
|       if( alf_cross_component_cb_coeff_abs[ j ] ) | |
|         alf_cross_component_cb_coeff_sign[ j ] | u(1) |
|     } | |
|   } | |
|   if( alf_cross_component_cr_filter_signal_flag ) { | |
|     alf_cross_component_cr_min_eg_order_minus1 | ue(v) |
|     for( i = 0; i < 3; i++ ) | |
|       alf_cross_component_cr_eg_order_increase_flag[ i ] | u(1) |
|     for ( j = 0; j < 14; j++ ) { | |
|       alf_cross_component_cr_coeff_abs[ j ] | uek(v) |
|       if( alf_cross_component_cr_coeff_abs[ j ] ) | |
|         alf_cross_component_cr_coeff_sign[ j ] | u(1) |
|     } | |
|   } | |
| } | |

Referring to the above two tables, the APS may include ALF data (alf_data( )). An APS including ALF data may be referred to as an ALF APS (ALF type APS). That is, the type of APS including ALF data may be an ALF type. The type of APS may be determined as information on the APS type or a syntax element (aps_params_type). The ALF data may include a Cb filter signal flag (alf_cross_component_cb_filter_signal_flag or alf_cc_cb_filter_signal_flag) related to whether cross-component filters for a Cb color component are signaled. The ALF data may include a Cr filter signal flag (alf_cross_component_cr_filter_signal_flag or alf_cc_cr_filter_signal_flag) related to whether cross-component filters for the Cr color component are signaled.

In an example, based on the Cr filter signal flag, the ALF data may include information (alf_cross_component_cr_coeff_abs) on absolute values of cross-component filter coefficients for the Cr color component and information on signs (alf_cross_component_cr_coeff_sign) on signs of cross-component filter coefficients for the Cr color component. Based on the information on the absolute values of the cross-component filter coefficients for the Cr color component and the information on the signs of the cross-component filter coefficients for the Cr color component, cross-component filter coefficients for the Cr color component may be derived.

In an example, the ALF data may include information (alf_cross_component_cb_coeff_abs) on absolute values of cross-component filter coefficients for the Cb color component and information (alf_cross_component_cb_coeff_sign) on signs of cross-component filter coefficients for the Cb color component. Based on the information on absolute values of cross-component filter coefficients for the Cb color component and information on signs of cross-component filter coefficients for the Cb color component, cross-component filter coefficients for the Cb color component may be derived.

The following table shows syntax related to ALF data according to another example.

TABLE 20

| | Descriptor |
|---|---|
| alf_data( ) { | |
|   alf_luma_filter_signal_flag | u(1) |
|   alf_chroma_filter_signal_flag | u(1) |
|   alf_cross_component_filter_signal_flag | u(1) |
|   if( alf_luma_filter_signal_flag ) { | |
|     ... | |
|   } | |
|   if( alf_chroma_filter_signal_flag ) { | |
|     ... | |
|   } | |
|   if( alf_cross_component_filter_signal_flag ) { | |
|     alf_cross_component_cb_filter_signal_flag | |
|     alf_cross_component_cr_filter_signal_flag | |
|     if( alf_cross_component_cb_filter_signal_flag ) { | |
|       alf_cross_component_cb_min_eg_order_minus1 | ue(v) |
|       for( i = 0; i < 3; i++ ) | |
|         alf_cross_component_cb_eg_order_increase_flag[ i ] | u(1) |
|       for ( j = 0; j < 14; j++ ) { | |
|         alf_cross_component_cb_coeff_abs[ j ] | uek(v) |
|         if( alf_cross_component_cb_coeff_abs[ j ] ) | |
|           alf_cross_component_cb_coeff_sign[ j ] | u(1) |
|       } | |
|     } | |
|     if( alf_cross_component_cr_filter_signal_flag ) { | |
|       alf_cross_component_cr_min_eg_order_minus1 | ue(v) |
|       for( i = 0; i < 3; i++ ) | |
|         alf_cross_component_cr_eg_order_increase_flag[ i ] | u(1) |
|       for ( j = 0; j < 14; j++ ) { | |
|         alf_cross_component_cr_coeff_abs[ j ] | uek(v) |
|         if( alf_cross_component_cr_coeff_abs[ j ] ) | |
|           alf_cross_component_cr_coeff_sign[ j ] | u(1) |
|       } | |
|     } | |
|   } | |
| } | |

Referring to the above table, after first transmitting alf_cross-component_filter_signal_flag, when alf_cross-component_filter_signal_flag is 1, Cb/Cr filter signal flag may be transmitted. That is, alf_cross_component_filter_signal_flag integrates Cb/Cr to determine whether to transmit CC-ALF filter coefficients.

The following table shows syntax related to ALF data according to another example.

TABLE 21

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     ... | |
|   } | |

TABLE 21-continued

| | Descriptor |
|---|---|
|   if( alf_chroma_filter_signal_flag ) { | |
|     ... | |
|   } | |
|   if( alf_cross_component_cb_filter_signal_flag ) { | |
|     for ( j = 0; j < 14; j++ ) { | |
|       alf_cross_component_cb_coeff_abs[ j ] | uek(v) |
|       if( alf_cross_component_cb_coeff_abs[ j ] ) | |
|         alf_cross_component_cb_coeff_sign[ j ] | u(1) |
|     } | |
|   } | |

TABLE 21-continued

| | Descriptor |
|---|---|
|   if( alf_cross_component_cr_filter_signal_flag ) { | |
|     for( j = 0; j < 14; j++ ) { | |
|       alf_cross_component_cr_coeff_abs[ j ] | uek(v) |
|       if( alf_cross_component_cr_coeff_abs[ j ] ) | |
|         alf_cross_componentcr_coeff_sign[ j ] | u(1) |
|     } | |
|   } | |
| } | |

The following table shows exemplary semantics for the syntax elements included in the above table.

TABLE 22 alf_cross_component_cb_filter_signal_flag equal to 1 specifies that a cross-component Cb filter set is signalled. alf_cross_component_cb_filter_signal_flag equal to 0 specifies that a cross-component Cb filter set is not signalled. When alf_cross_component_cb_filter_signal_flag is not present, it is inferred to be equal 0.
   alf_cross_component_cr_filter_signal_flag equal to 1 specifies that a cross-component Cr filter set is signalled. alf_cross_component_cr_filter_signal_flag equal to 0 specifies that a cross-component Cr filter set is not signalled. When alf_cross_component_cr_filter_signal_flag is not present, it is inferred to be equal 0.
   alf_cross_component_cb_coeff_abs[ j ] specifies the absolute value of the j-th coefficient of the signalled cross-component Cb filter. When alf_cross_component_cb_coeff_abs[ j ] is not present, it is inferred to be equal 0.
   The order k of the exp-Golomb binarization uek(v) is set equal to 3.
   alf_cross_component_cb_coeff_sign[ j ] specifies the sign of the j-th cross-component Cb filter coefficient as follows:
     If alf_cross_component_cb_coeff_sign[ j ] is equal to 0, the corresponding cross-component Cb filter coefficient has a positive value.
     Otherwise (alf_cross_component_cb_coeff_sign[ j ] is equal to 1), the corresponding cross-component Cb filter coefficient has a negative value.
   When alf_cross_component_cb_coeff_sign[ j ] is not present, it is inferred to be equal to 0.
   The cross-component Cb filter coefficients AlfCCCoeffCb[ adaptation_parameter_set_id ] with elements AlfCCCoeffCb[ adaptation_parameter_set_id ][ j ], with j = 0..13 are derived as follows:
     AlfCCCoeffCb[ adaptation_parameter_set_id ][ j ] = alf_cross_component_cb_coeff_abs[ j ] *
       ( 1 − 2 * alf_cross_component_cb_coeff_sign[ j ] )
   It is a requirement of bitstream conformance that the values of
AlfCCCoeffCb[ adaptation_parameter_set_id ][ j ] with j = 0..13 shall be in the range of −2$^{10}$ − 1 to 2$^{10}$ − 1, inclusive.
   alf_cross_component_cr_coeff_abs[ j ] specifies the absolute value of the j-th coefficient of the signalled cross-component Cr filter. When alf_cross_component_cr_coeff_abs[ j ] is not present, it is inferred to be equal 0.
   The order k of the exp-Golomb binarization uek(v) is set equal to 3.
   alf_cross_component_cr_coeff_sign[ j ] specifies the sign of the j-th cross-component Cr filter coefficient as follows:
     If alf_cross_component_cr_coeff_sign[ j ] is equal to 0, the corresponding cross-component Cr filter coefficient has a positive value.
     Otherwise (alf_cross_component_cr_coeff_sign[ j ] is equal to 1), the corresponding cross-component Cr filter coefficient has a negative value.
   When alf_cross_component_cr_coeff_sign[ j ] is not present, it is inferred to be equal to 0.
   The cross-component Cr filter coefficients AlfCCCoeffCr[ adaptation_parameter_set_id ] with elements AlfCCCoeffCr[ adaptation_parameter_set_id ][ j ], with j = 0..13 are derived as follows:
     AlfCCCoeffCr[ adaptation_parameter_set_id ][ j ] = alf_cross_component_cr_coeff_abs[ j ] *
       ( 1 − 2 * alf_cross_component_cr_coeff_sign[ j ] )
It is a requirement of bitstream conformance that the values of
AlfCCCoeffCr[ adaptation_parameter_set_id ][ j ] with j = 0..13 shall be in the range of −2$^{10}$ − 1 to 2$^{10}$ − 1, inclusive.

The following table shows a syntax related to ALF data according to another example.

TABLE 23

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     ... | |
|   if( alf_chroma_filter_signal_flag ) { | |
|     ... | |
|   } | |
|   if( alf_cross_component_cb_filter_signal_flag ) { | |
|     ccalf_cb_num_alt_filters_minus1 | ue(k) |
|     for(altIdx = 0; altIdx <= | |
|     ccalf_cb_num_alt_filters_minus1; altIdx++) { | |
|       for ( j = 0; j < 14; j++ ) { | |
|         alf_cross_component_cb_coeff_abs[ j ] | uek(v) |
|         if( alf_cross_component_cb_coeff_abs[ j ] ) | |
|           alf_cross_component_cb_coeff_sign[ j ] | u(1) |
|       } | |
|     } | |
|   } | |
|   if( alf_cross_component_cr_filter_signal_flag ) { | |
|     ccalf_cr_num_alt_filters_minus1 | ue(k) |
|     for(altIdx = 0; altIdx <= | |
|     ccalf_cr_num_alt_filters_minus1; altIdx++) { | |
|       for ( j = 0; j < 14; j++ ) { | |
|         alf_cross_component_cr_coeff_abs[ j ] | uek(v) |
|         if( alf_cross_component_cr_coeff_abs[ j ] ) | |
|           alf_cross_component_cr_coeff_sign[ j ] | u(1) |
|       } | |
|     } | |
|   } | |
| } | |

The following table shows exemplary semantics for the syntax elements included in the above table.

TABLE 24 alf_cross_component_cb_filter_signal_flag equal to 1 specifies that a cross-component Cb filter set is signalled. alf_cross_component_cb_filter_signal_flag equal to 0 specifies that a cross-component Cb filter set is not signalled. When alf_cross_component_cb_filter_signal_flag is not present, it is inferred to be equal 0.
   alf_cross_component_cr_filter_signal_flag equal to 1 specifies that a cross-component Cr filter set is signalled. alf_cross_component_cr_filter_signal_flag equal to 0 specifies that a cross-component Cr filter set is not signalled. When alf_cross_component_cr_filter_signal_flag is not present, it is inferred to be equal 0.

TABLE 24-continued alf_cb_num_alt_filters_minus1 plus 1 specifies the number of alternative cross component adaptive loop filters for cb components.
  alf_cross_component_cb_coeff_abs[ j ] specifies the absolute value of the j-th coefficient of the signalled cross-component Cb filter. When alf_cross_component_cb_coeff_abs[ j ] is not present, it is inferred to be equal 0.
  The order k of the exp-Golomb binarization uek(v) is set equal to 3.
  alf_cross_component_cb_coeff_sign[ j ] specifies the sign of the j-th cross-component Cb filter coefficient as follows:
  If alf_cross_component_cb_coeff_sign[ j ] is equal to 0, the corresponding cross-component Cb filter coefficient has a positive value.
  Otherwise (alf_cross_component_cb_coeff_sign[ j ] is equal to 1), the corresponding cross-component Cb filter coefficient has a negative value.
  When alf_cross_component_cb_coeff_sign[ j ] is not present, it is inferred to be equal to 0.
  The cross-component Cb filter coefficients AlfCCCoeffCb[ adaptation_parameter_set_id ] with elements AlfCCCoeffCb[ adaptation_parameter_set_id ][ j ], with j = 0..13 are derived as follows:
    AlfCCCoeffCb[ adaptation_parameter_set_id ][ j ] = alf_cross_component_cb_coeff_abs[ j ] *
      ( 1 − 2 * alf_cross_component_cb_coeff_sign[ j ] )
  It is a requirement of bitstream conformance that the values of
AlfCCCoeffCb[ adaptation_parameter_set_id ][ j ] with j = 0..13 shall be in the range of −210 − 1 to 210 − 1, inclusive.
  alf_cr_num_alt_filters_minus1 plus 1 specifies the number of alternative cross component adaptive loop filters for cr components.
  alf_cross_component_cr_coeff_abs[ j ] specifies the absolute value of the j-th coefficient of the signalled cross-component Cr filter. When alf_cross_conrponent_cr_coeff_abs[ j ] is not present, it is inferred to be equal 0.
  The order k of the exp-Golomb binarization uek(v) is set equal to 3.
  alf_cross_component_cr_coeff_sign[ j ] specifies the sign of the j-th cross-component Cr filter coefficient as follows:
  If alf_cross_component_cr_coeff_sign[ j ] is equal to 0, the corresponding cross-component Cr filter coefficient has a positive value.
  Otherwise (alf_cross_component_cr_coeff_sign[ j ] is equal to 1), the corresponding cross-component Cr filter coefficient has a negative value.
  When alf_cross_component_cr_coeff_sign[ j ] is not present, it is inferred to be equal to 0.
  The cross-component Cr filter coefficients AlfCCCoeffCr[ adaptation_parameter_set_id ] with elements AlfCCCoeffCr[ adaptation_parameter_set_id ][ j ], with j = 0..13 are derived as follows:
    AlfCCCoeffCr[ adaptation_parameter_set_id ][ j ] = alf_cross_component_cr_coeff_abs[ j ] *
      (1 2 * alf_cross_component_cr_coeff_sign[ j ] )
  It is a requirement of bitstream conformance that the values of
AlfCCCoeffCr[ adaptation_parameter_set_id ][ j ] with j = 0..13 shall be in the range of −210 − 1 to 210 − 1. inclusive.

In the above two tables, the order of exp-Golomb binarization for parsing the alf_cross_component_cb_coeff_abs [j] and alf_cross_component_cr_coeff_abs[j] syntax may be defined by one of 0 to 9 values.

Referring to the above two tables, ALF data may include a Cb filter signal flag (alf_cross_component_cb_filter_signal_flag or alf_cc_cb_filter_signal_flag) related to whether cross-component filters for a Cb color component are signaled. Based on the Cb filter signal flag (alf_cross_component_cb_filter_signal_flag), the ALF data may include information (ccalf_cb_num_alt_filters_minus1) related to the number of cross-component filters for the Cb color component. Based on information related to the number of cross-component filters for the Cb color component, the ALF data may include information (alf_cross_component_cb_coeff_abs) on absolute values of cross-component filter coefficients for the Cb color component and information (alf_cross_component_cr_coeff_sign) on signs of component filter coefficients a cross for the Cb color component. Based on the information on absolute values of cross-component filter coefficients for the Cb color component and the information on signs of component filter coefficients a cross for the Cb color component, cross-component filter coefficients for the Cb color component may be derived.

In an example, the ALF data may include a Cr filter signal flag (alf_cross_component_cr_filter_signal_flag or alf_cc_cr_filter_signal_flag) related to whether cross-component filters for the Cr color component are signaled. Based on the Cr filter signal flag (alf_cross_component_cr_filter_signal_flag), the ALF data may include information (ccalf_cr_num_alt_filters_minus1) related to the number of cross-component filters for the Cr color component. Based on the information related to the number of cross-component filters for the Cr color component, the ALF data may include information (alf_cross_component_cr_coeff_abs) on absolute values of cross-component filter coefficients for the Cr color component and information (alf_cross_component_cr_coeff_sign) on the signs of the cross-component filter coefficients for the Cr color component. Based on the Information on absolute values of cross-component filter coefficients for the Cr color component and the information on the signs of the cross-component filter coefficients for the Cr color component, cross-component filter coefficients for the Cr color component may be derived.

The following table shows syntax regarding a coding tree unit according to an embodiment of the present disclosure.

TABLE 25

| | Descriptor |
|---|---|
| coding_tree_unit( ) { | |
| ... | |
|   if( slice_alf_enabled_flag ) { | |

TABLE 25-continued

| | Descriptor |
|---|---|
|     alf_ctb_flag[ 0 ][ xCtb >> CtbLog2SizeY ][ yCtb >> CtbLog2SizeY ] | ae(v) |
| ... | |
|     } | |
|     if( slice_alf_chroma_idc = = 1 \|\| slice_alf_chroma_idc = = 3 ) { | |
|         alf_ctb_flag[ 1 ][ xCtb >> CtbLog2SizeY ][ yCtb >> CtbLog2SizeY ] | ae(v) |
|         if( alf_ctb_flag[ 1 ][ xCtb >> CtbLog2SizeY ][ yCtb >> CtbLog2SizeY ] | |
|           && aps_alf_chroma_num_alt_filters_minus1 > 0 ) | |
|         alf_ctb_filter_alt_idx[ 0 ][ xCtb >> CtbLog2SizeY ][ yCtb >> CtbLog2SizeY ] | ae(v) |
|     } | |
|     if( slice_alf_chroma_idc = = 2 \|\| slice_alf_chroma_idc = = 3 ) { | |
|         alf_ctb_flag[ 2 ][ xCtb >> CtbLog2SizeY ][ yCtb >> CtbLog2SizeY ] | ae(v) |
|         if( alf_ctb_flag[ 2 ][ xCtb >> CtbLog2SizeY ][ yCtb >> CtbLog2SizeY ] | |
|           && aps_alf_chroma_num_alt_filters_minus1 > 0 ) | |
|         alf_ctb_filter_alt_idx[ 1 ][ xCtb >> CtbLog2SizeY ][ yCtb >> CtbLog2SizeY ] | ae(v) |
|     if( slice_ccalf_chroma_idc = = 1 \|\| slice_ccalf_chroma_idc = = 3 ) | |
|         ccalf_ctb_flag[ 0 ][ xCtb >> CtbLog2SizeY ][ yCtb >> CtbLog2SizeY ] | ae(v) |
|     if( slice_ccalf_chroma_idc = = 2 \|\| slice_chroma_idc = = 3 ) | |
|         ccalf_ctb_flag[ 1 ][ xCtb >> CtbLog2SizeY ][ yCtb >> CtbLog2SizeY ] | ae(v) |
|     } | |
| } | |
| ... | |

The following table shows exemplary semantics for the syntax elements included in the above table.

TABLE 26 ccalf_ctb_flag[ chromaIdx ][ xCtb >> CtbLog2SizeY ][ yCtb >> CtbLog2SizeY ] equal to 1 specifies that the cross component adaptive loop filter is applied to the coding tree block of the chroma component indicated by chromaIdx, equal to 0 for Cb and equal 1 for Cr, of the coding tree unit at luma location ( xCtb, yCtb ). ccalf_ctb_flag[ chromaIdx ][ xCtb >> CtbLog2SizeY ][ yCtb >> CtbLog2SizeY ] equal to 0 specifies that the adaptive loop filter is not applied to the coding tree block of the chroma component indicated by chromaIdx of the coding tree unit at luma location ( xCtb, yCtb ).
When ccalf_ctb_flag[ cIdx ][ xCtb >> CtbLog2SizeY ][ yCtb >> CtbLog2SizeY ] is not present, it is inferred to be equal to 0.

The following table shows a coding tree unit syntax according to another example of this embodiment.

TABLE 27

| | Descriptor |
|---|---|
| coding_tree_unit( ) { | |
| ... | |
|     if( slice_alf_enabled_flag ){ | |
|         alf_ctb_flag[ 0 ][ xCtb >> CtbLog2SizeY ][ yCtb >> CtbLog2SizeY ] | ae(v) |
|     ... | |
|     } | |
|     if( slice_alf_chroma_idc = = 1 \|\| slice_alf_chroma_idc = = 3 ) { | |
|         alf_ctb_flag[ 1 ][ xCtb >> CtbLog2SizeY ][ yCtb >> CtbLog2SizeY ] | ae(v) |
|         ccalf_ctb_flag[ 0 ][ xCtb >> CtbLog2SizeY ][ yCtb >> CtbLog2SizeY ] | ae(v) |
|         if( alf_ctb_flag[ 1 ][ xCtb >> CtbLog2SizeY ][ yCtb >> CtbLog2SizeY ] | |
|           && aps_alf_chroma_num_alt_filters_minus1 > 0 ) | |
|         alf_ctb_filter_alt_idx[ 0 ][ xCtb >> CtbLog2SizeY ][ yCtb >> CtbLog2SizeY ] | ae(v) |
|     } | |
|     if( slice_alf_chroma_idc = = 2 \|\| slice_alf_chroma_idc = = 3 ) { | |
|         alf_ctb_flag[ 2 ][ xCtb >> CtbLog2SizeY ][ yCtb >> CtbLog2SizeY ] | ae(v) |
|         ccalf_ctb_flag[ 1 ][ xCtb >> CtbLog2SizeY ][ yCtb >> CtbLog2SizeY ] | ae(v) |
|         if( alf_ctb_flag[ 2 ][ xCtb >> CtbLog2SizeY ][ yCtb >> CtbLog2SizeY ] | |
|           && aps_alf_chroma_num_alt_filters_minus1 > 0 ) | |
|         alf_ctb_filter_alt_idx[ 1 ][ xCtb >> CtbLog2SizeY ][ yCtb >> CtbLog2SizeY ] | ae(v) |
|     } | |
| } | |
| ... | |

Referring to the table above, CCALF may be applied in units of CTUs. In an example, the image information may include information (coding_tree_unit( )) on a coding tree unit. The information on the coding tree unit may include information (ccalf_ctb_flag[0]) on whether a cross-component filter is applied to the current block of a Cb color component, and/or information (ccalf_ctb_flag[1]) on whether a cross-component filter is applied to the current block of a Cr color component. In addition, the information on the coding tree unit may include information (ccalf_ctb_filter_alt_idx[0]) on a filter set index of a cross-component filter applied to the current block of a Cb color component, and/or information (ccalf_ctb_filter_alt_idx[1]) on the filter set index of the cross-component filter applied to the current block of a Cr color component. The syntax may be adaptively transmitted according to the syntax slice_ccalf_enabled_flag and slice_ccalf_chroma_idc.

The following table shows a coding tree unit syntax according to another example of this embodiment.

TABLE 28

| | Descriptor |
|---|---|
| coding_tree_unit( ) { | |
| ... | |
|   if( slice_alf_enabled_flag ){ | |
|     alf_ctb_flag[ 0 ][ xCtb >> CtbLog2SizeY ][ yCtb >> CtbLog2SizeY ] | ae(v) |
| ... | |
|   } | |
|   if( slice_alf_chroma_idc = = 1 \|\| slice_alf_chroma_idc = = 3 ) { | |
|     alf_ctb_flag[ 1 ][ xCtb >> CtbLog2SizeY ][ yCtb >> CtbLog2SizeY ] | ae(v) |
|     if( alf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|     alf_ctb_filter_alt_idx[ 0 ][ xCtb >> CtbLog2SizeY ][ yCtb >> CtbLog2SizeY ] | ae(v) |
|   } | |
|   if( slice_alf_chroma_idc = = 2 \|\| slice_alf_chroma_idc = = 3 ) { | |
|     alf_ctb_flag[ 2 ][ xCtb >> CtbLog2SizeY ][ yCtb >> CtbLog2SizeY ] | ae(v) |
|     if( alf_ctb_flag[ 2 ][ xCtb >> CtbLog2SizeY ][ yCtb >> CtbLog2SizeY ] | |
|       && aps_alf_chroma_num_alt_filters_minus1 > 0 ) | |
|     alf_ctb_filter_alt_idx[ 1 ][ xCtb >> CtbLog2SizeY ][ yCtb >> CtbLog2SizeY ] | ae(v) |
|   } | |
|   if( slice_ccalf_chroma_idc = = 1 \|\| slice_ccalf_chroma_idc = = 3 ) { | |
|     ccalf_ctb_flag[ 0 ][ xCtb >> CtbLog2SizeY ][ yCtb >> CtbLog2SizeY ] | ae(v) |
|     if( ccalf_ctb_flag[ 0 ][ xCtb >> CtbLog2SizeY ][ yCtb >> CtbLog2SizeY ] | |
|       && aps_alf_chroma_num_alt_filters_minus1 > 0 ) | |
|     ccalf_ctb_filter_alt_idx[ 0 ][ xCtb >> CtbLog2SizeY ][ yCtb >> CtbLog2SizeY ] | ae(v) |
|   } | |
|   if( slice_ccalf_chroma_idc = = 2 \|\| slice_ccalf_chroma_idc = = 3 ) { | |
|     ccalf_ctb_flag[ 1 ][ xCtb >> CtbLog2SizeY ][ yCtb >> CtbLog2SizeY ] | ae(v) |
|     if( ccalf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|     ccalf_ctb_filter_alt_idx[ 1 ][ xCtb >> CtbLog2SizeY ][ yCtb >> CtbLog2SizeY ] | ae(v) |
|   } | |
| } | |
| ... | |

The following table shows exemplary semantics for the syntax elements included in the above table.

TABLE 29 ccalf_ctb_flag[ chromaIdx ][ xCtb >> CtbLog2SizeY ][ yCtb >> CtbLog2SizeY ] equal to 1 specifies that the cross component adaptive loop filter is applied to the coding tree block of the chroma component indicated by chromaIdx, equal to 0 for Cb and equal 1 for Cr, of the coding tree unit at luma location ( xCtb, yCtb ). ccalf_ctb_flag[ cIdx ][ xCtb >> CtbLog2SizeY ][ yCtb >> CtbLog2SizeY ] equal to 0 specifies that the adaptive loop filter is not applied to the coding tree block of the chroma component indicated by chromaIdx of the coding tree unit at luma location ( xCtb, yCtb ).
When ccalf_ctb_flag[ cIdx ][ xCtb >> CtbLog2SizeY ][ yCtb >> CtbLog2SizeY ] is not present, it is inferred to be equal to 0.
ccalf_ctb_filter_alt_idx[ chromaIdx ][ xCtb >> CtbLog2SizeY ][ yCtb >> CtbLog2SizeY ] specifies the index of the alternative cross component adaptive loop filter applied to the coding tree block of the chroma component, with chromaIdx equal to 0 for Cb and chromaIdx equal 1 for Cr, of the coding tree unit at luma location ( xCtb, yCtb ). When ccalf_ctb_filter_alt_idx[ chromaIdx ][ xCtb >> CtbLog2SizeY ][ yCtb >> CtbLog2SizeY ] is not present, it is infered to be equal to zero.

The following table shows a coding tree unit syntax according to another example of this embodiment. The syntax elements included in the table below may be described according to Table 29.

TABLE 30

| | Descriptor |
|---|---|
| coding_tree_unit( ) { | |
| ... | |
|   if( slice_alf_enabled_flag ){ | |
|     alf_ctb_flag[ 0 ][ xCtb >> CtbLog2SizeY ][ yCtb >> CtbLog2SizeY ] | ae(v) |
| ... | |
|   } | |
|   if( slice_alf_chroma_idc = = 1 | | slice_alf_chroma_idc = = 3 ) { | |
|     alf_ctb_flag[ 1 ][ xCtb >> CtbLog2SizeY ][ yCtb >> CtbLog2SizeY ] | ae(v) |
|     ccalf_ctb_flag[ 0 ][ xCtb >> CtbLog2SizeY ][ yCtb >> CtbLog2SizeY ] | ae(v) |
|     if( alf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|       alf_ctb_filter_alt_idx[ 0 ][ xCtb >> CtbLog2SizeY ][ yCtb >> CtbLog2SizeY ] | ae(v) |
|     if( ccalf_ctb_flag[ 0 ][ xCtb >> CtbLog2SizeY ][ yCtb >> CtbLog2SizeY ] | |
|       && aps_alf_chroma_num_alt_filters_minus1 > 0 ) | |
|       ccalf_ctb_filter_alt_idx[ 0 ][ xCtb >> CtbLog2SizeY ][ yCtb >> CtbLog2SizeY ] | ae(v) |
|   } | |
|   if( slice_alf_chroma_idc = = 2 | | slice_alf_chroma_idc = = 3 ) { | |
|     alf_ctb_flag[ 2 ][ xCtb >> CtbLog2SizeY ][ yCtb >> CtbLog2SizeY ] | ae(v) |
|     ccalf_ctb_flag[ 1 ][ xCtb >> CtbLog2SizeY ][ yCtb >> CtbLog2SizeY ] | ae(v) |
|     if( alf_ctb_flag[ 2 ][ xCtb >> CtbLog2SizeY ][ yCtb >> CtbLog2SizeY ] | |
|       && aps_alf_chroma_num_alt_filters_minus1 > 0 ) | |
|       alf_ctb_filter_alt_idx[ 1 ][ xCtb >> CtbLog2SizeY ][ yCtb >> CtbLog2SizeY ] | ae(v) |
|     if( ccalf_ctb_flag[ 1 ][ xCtb >> CtbLog2SizeY ][ yCtb >> CtbLog2SizeY ] | |
|       && aps_alf_chroma_num_alt_filters_minus1 > 0 ) | |
|       ccalf_ctb_filter_alt_idx[ 1 ][ xCtb >> CtbLog2SizeY ][ yCtb >> CtbLog2SizeY ] | ae(v) |
|   } | |
| } | |
| ... | |

In an example, the image information may include information on a coding tree unit (coding_tree_unit( )). The information on the coding tree unit may include information on whether a cross-component filter is applied to the current block of a Cb color component (ccalf_ctb_flag[0]) and/or information (ccalf_ctb_flag[1]) on whether a cross-component filter is applied to the current block of a Cr color component. In addition, the information on the coding tree unit may include information (ccalf_ctb_filter_alt_idx[0]) on a filter set index of a cross-component filter applied to the current block of a Cb color component, and/or information (ccalf_ctb_filter_alt_idx[1]) on the filter set index of the cross-component filter applied to the current block of a Cr color component.

Figure 11:
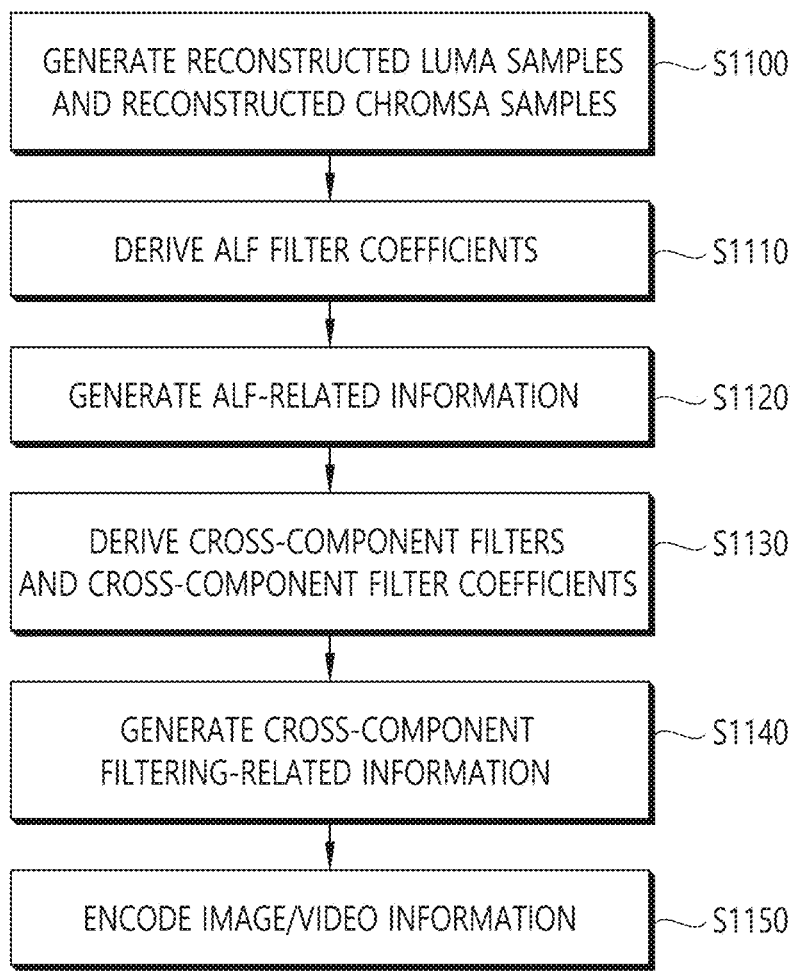
FIGS. 11 and 12 schematically show an example of a video/image encoding method and related components according to embodiment(s) of present disclosure.
Figure 12:
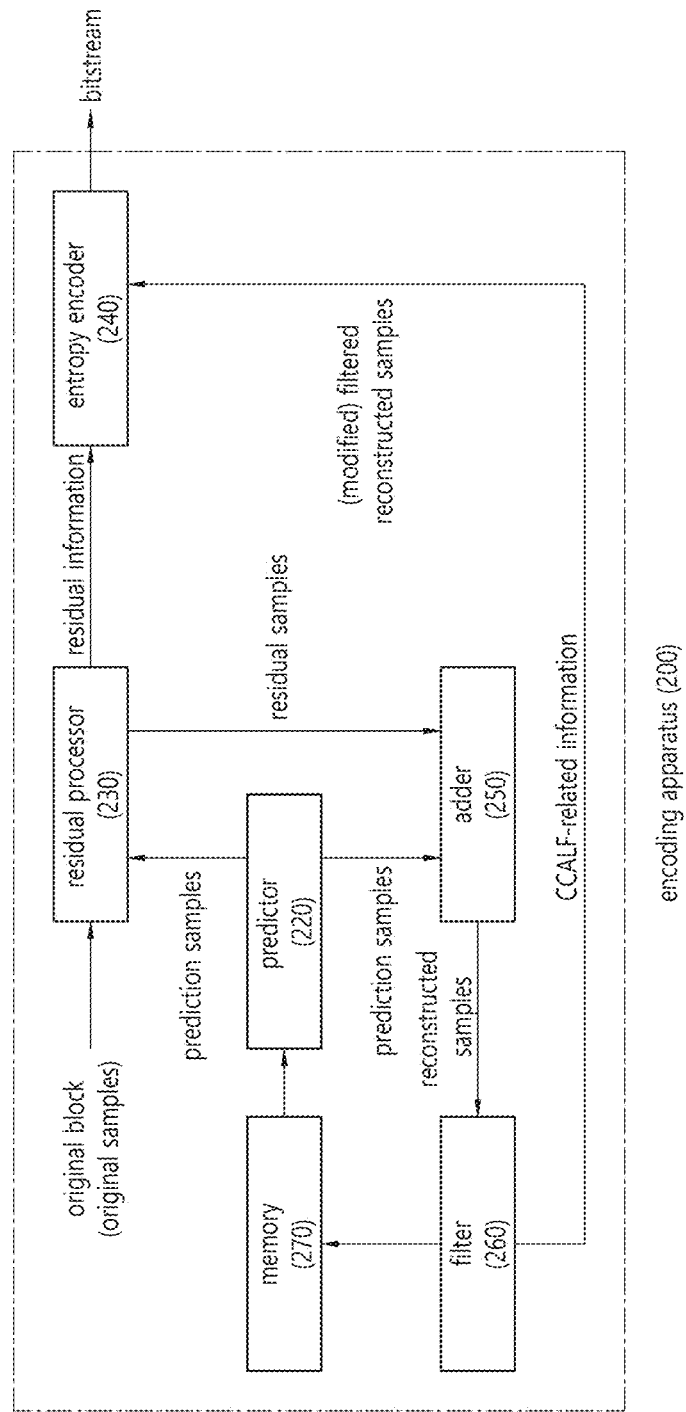

FIGS. 11 and 12 schematically show an example of a video/image encoding method and related components according to embodiment(s) of the present disclosure. The method disclosed in FIG. 11 may be performed by the encoding apparatus disclosed in FIG. 2. Specifically, for example, S1100 of FIG. 11 may be performed by the adder 250 of the encoding apparatus, S1110 to S1140 may be performed by the filter 260 of the encoding apparatus, and S1570 may be performed by the entropy encoder 240 of the encoding apparatus. The method disclosed in FIG. 11 may include the embodiments described above in the present disclosure.

Referring to FIG. 11, the encoding apparatus may generate reconstructed luma samples and reconstructed chroma samples of the current block (S1100). The encoding apparatus may generate residual luma samples and/or residual chroma samples. The encoding apparatus may generate reconstructed luma samples based on the residual luma samples and may generate reconstructed chroma samples based on the residual chroma samples.

In an example, the residual samples for the current block may be generated based on original samples and prediction samples of the current block. Specifically, the encoding apparatus may generate prediction samples of the current block based on the prediction mode. In this case, various prediction methods disclosed in the present disclosure, such as inter prediction or intra prediction, may be applied. Residual samples may be generated based on the prediction samples and the original samples.

In an example, the encoding apparatus may generate residual luma samples. The residual luma samples may be generated based on the original luma samples and the predicted luma samples. In an example, the encoding apparatus may generate residual chroma samples. The residual chroma samples may be generated based on the original chroma samples and the predicted chroma samples.

The encoding apparatus may derive transform coefficients. The encoding apparatus may derive transform coefficients based on a transform process for the residual samples. The encoding apparatus may derive transform coefficients (luma transform coefficients) for the residual luma samples and/or transform coefficients (chroma transform coefficients) for the residual chroma samples. For example, the transform process may include at least one of DCT, DST, GBT, or CNT.

The encoding apparatus may derive quantized transform coefficients. The encoding apparatus may derive quantized transform coefficients based on a quantization process for the transform coefficients. The quantized transform coefficients may have a one-dimensional vector form based on a coefficient scan order. The quantized transform coefficients may include quantized luma transform coefficients and/or quantized chroma transform coefficients.

The encoding device may generate residual information. The encoding apparatus may generate residual information indicating (including) the quantized transform coefficients. The residual information may be generated through various encoding methods such as exponential Golomb, CAVLC, CABAC, and the like.

The encoding device may generate prediction-related information. The encoding apparatus may generate the prediction-related information based on prediction samples and/or a mode applied thereto. The prediction-related information may include information on various prediction modes (e.g., merge mode, MVP mode, etc.), MVD information, and the like.

The encoding device may derive ALF filter coefficients for the ALF process (S1110). The ALF filter coefficients may include ALF luma filter coefficients for reconstructed luma samples and ALF chroma filter coefficients for reconstructed chroma samples. Filtered reconstructed luma samples and/or filtered reconstructed chroma samples may be generated based on the ALF filter coefficients.

The encoding device may generate ALF-related information (S1120). The encoding device may generate the ALF-related information based on the ALF filter coefficients. The encoding apparatus derives an ALF-related parameter, which may be applied for filtering the reconstructed samples, and generates ALF-related information. For example, the ALF-related information may include the ALF-related information described above in the present disclosure.

The encoding apparatus may derive cross-component filters (CCALF filters) and/or cross-component filter coefficients (CCALF filter coefficients) (S1130). The cross-component filters and/or cross-component filter coefficients may be used in the CCALF process. Modified filtered reconstructed chroma samples may be generated based on the cross-component filters and/or cross-component filter coefficients.

The encoding device may generate cross-component filtering related information (or CCALF related information) (S1140). In an example, the cross-component filtering related information may include information on the number of the cross-component filters and information on the cross-component filter coefficients. The cross-component filters may include cross-component filters for the Cb color component and cross-component filters for the Cr color component.

In an example, the CCALF-related information may include a CCALF-enabled flag, a flag related to whether CCALF is available for a Cb (or Cr) color component, a Cb (or Cr) filter signal flag related to whether cross-component filters for a Cb (or Cr) color component are signaled, information related to the number of cross-component filters for the Cb (or Cr) color component, information on the values of the cross-component filter coefficients for the Cb (or Cr) color component, information on the absolute values of the cross-component filter coefficients for the Cb (or Cr) color component, information on the signs of the cross-component filter coefficients for the Cb (or Cr) color component, and/or information on whether a cross-component filter is applied to a current block of a Cb (or Cr) color component in the information (coding tree unit syntax) on the coding tree unit.

The image/video information may include various types of information according to an embodiment of the present disclosure. For example, the image/video information may include information disclosed in at least one of Tables 1 to 30 described above.

In an embodiment, the image information may include a sequence parameter set (SPS). The SPS may include a CCALF-enabled flag related to whether the cross-component filtering is available. Based on a determination that the CCALF-enabled flag is 1, ID information (identifier information) of adaptation parameter sets (APSs) including ALF data used for derivation of cross-component filter coefficients for CCALF may be derived. The image information may include slice header information.

According to an example of an embodiment, the slice header information may include ID information of APSs including ALF data used for deriving the cross-component filter coefficients. In another example, based on determination that the CCALF-enabled flag is 1, the slice header information may include ID information of the APSs including ALF data used for deriving the cross-component filter coefficients.

In an embodiment, the SPS may include an ALF-enabled flag (sps_ccalf_enabled_flag) related to whether ALF is available. Based on a determination that the value of the first ALF-enabled flag is 1, the SPS may include a CCALF enabled flag related to whether the cross-component filtering is available In an embodiment, the image information may include slice header information and an adaptation parameter set (APS). The header information may include information related to an identifier of the APS including the ALF data. For example, the cross-component filter coefficients may be derived based on the ALF data.

In an embodiment, the slice header information may include an ALF-enabled flag (slice_alf_enabled_flag) related to whether ALF is available. Sps_alf_enabled_flag and slice_alf_enabled_flag may be referred to as a first ALF-enabled flag and a second ALF-enabled flag, respectively. Based on a determination that the value of the ALF enabled flag (slice_alf_enabled_flag) is 1, whether the value of the CCALF enabled flag is 1 may be determined. In an example, based on a determination that the value of the ALF-enabled flag is 1, the CCALF may be available to the slice In an embodiment, the header information (slice header information) may include a first flag related to whether CCALF is available for the Cb color component of the filtered reconstructed chroma samples and a second flag related to whether CCLF is available for the Cr color component of the filtered reconstructed chroma samples. In another example, based on a determination that the value of the ALF enabled flag (slice_alf_enabled_flag) is 1, the header information (slice header information) may include a first flag related to whether CCALF is available for the Cb color component of the filtered reconstructed chroma samples and a second flag related to whether CCLF is available for the Cr color component of the filtered reconstructed chroma samples.

In an embodiment, based on the determination that the value of the first flag is 1, the slice header information may include ID information (Information related to the identifier of the second APS) of the first APS for deriving cross-component filter coefficients for the Cb color component. Based on the determination that the value of the second flag is 1, the slice header information may include ID information (information related to the identifier of the second APS) of the second APS for deriving cross-component filter coefficients for the Cr color component.

In an embodiment, the first ALF data included in the first APS may include a Cb filter signal flag related to whether cross-component filters for the Cb color component are signaled. Based on the Cb filter signal flag, the first ALF data may include information related to the number of cross-component filters for the Cb color component. Based on information related to the number of cross-component filters for the Cb color component, the first ALF data may include information on absolute values of cross-component filter coefficients for the Cb color component and information on signs of the cross-component filter coefficients for the Cb color component. Based on the information on the information on absolute values of cross-component filter coefficients for the Cb color component and information on signs of the cross-component filter coefficients for the Cb color component, the cross-component filter coefficients for the Cb color component may be derived.

In an embodiment, information related to the number of cross-component filters for the Cb color component may be zero-order exponential Golomb ($0^{th}$ EG) coded.

In an embodiment, the second ALF data included in the second APS may include a Cr filter signal flag related to whether the cross-component filters for the Cr color component are signaled. Based on the Cr filter signal flag, the second ALF data may include information related to the number of cross-component filters for the Cr color component. Based on the information related to the number of cross-component filters for the Cr color component, the second ALF data may include information on absolute values of cross-component filter coefficients for the Cr color component and information on the signs of the cross-component filter coefficients for the Cr color component. Based on the absolute values of cross-component filter coefficients for the Cr color component and the information on the signs of the cross-component filter coefficients for the Cr color component, the cross-component filter coefficients for the Cr color component may be derived.

In an embodiment, the information related to the number of cross-component filters for the Cr color component may be zero-order exponential Golomb ($0^{th}$ EG) coded.

In an embodiment, the image information may include information on a coding tree unit. The information on the coding tree unit may include information on whether a cross-component filter is applied to the current block of a Cb color component and/or information on whether a cross-component filter is applied to the current block of a Cr color component.

In an embodiment, the information on the coding tree unit may include information on a filter set index of a cross-component filter applied to the current block of a Cb color component, and/or information on a filter set index of a cross-component filter applied to the current block of a Cr color component.

Figure 13:
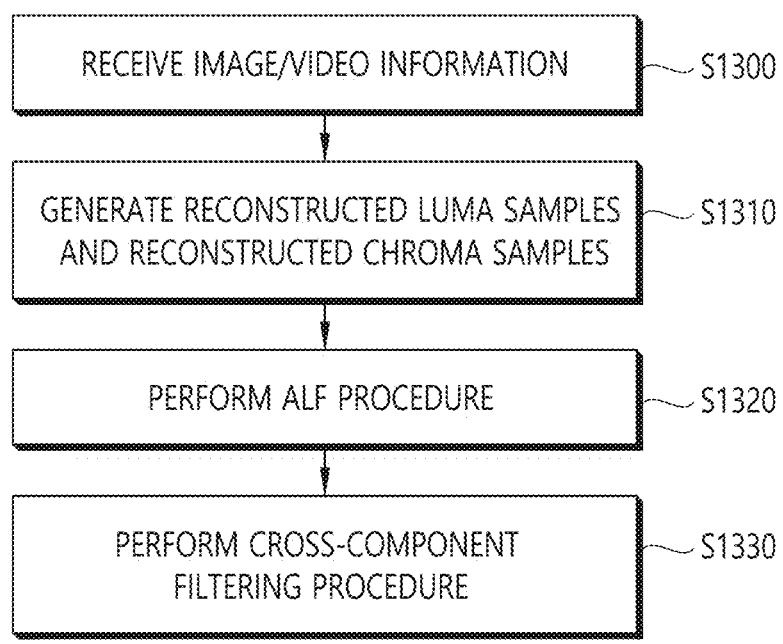
FIGS. 13 and 14 schematically show an example of an image/video decoding method and related components according to embodiment(s) of present disclosure.
Figure 14:
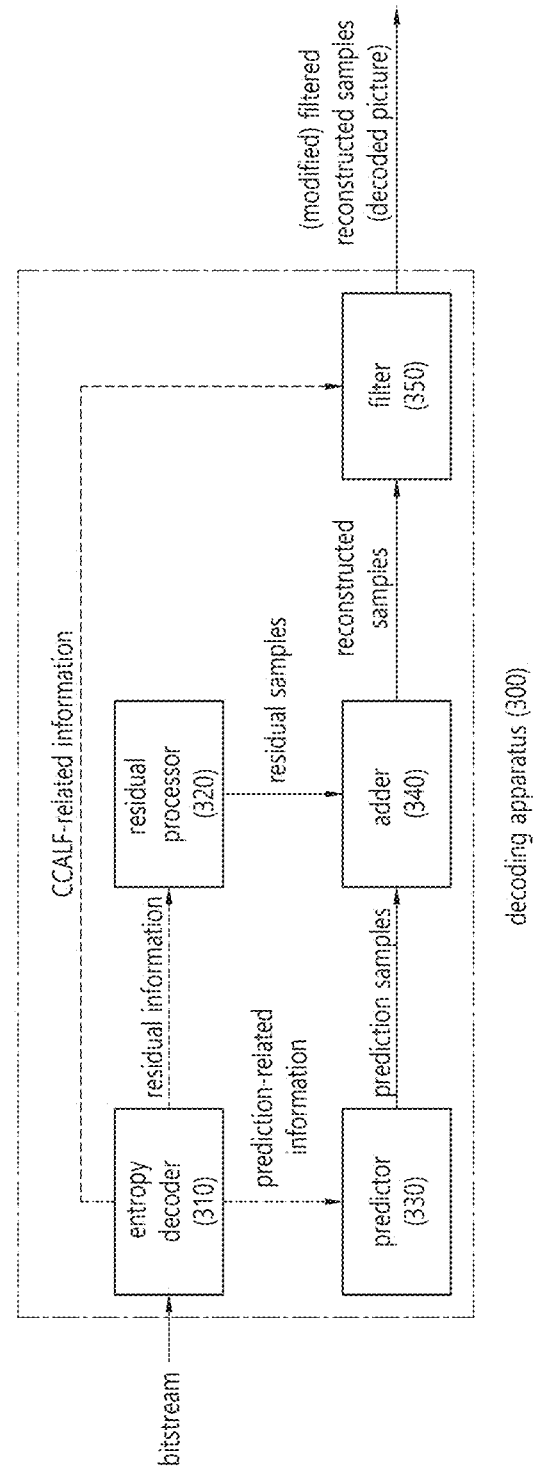
Figure 15:
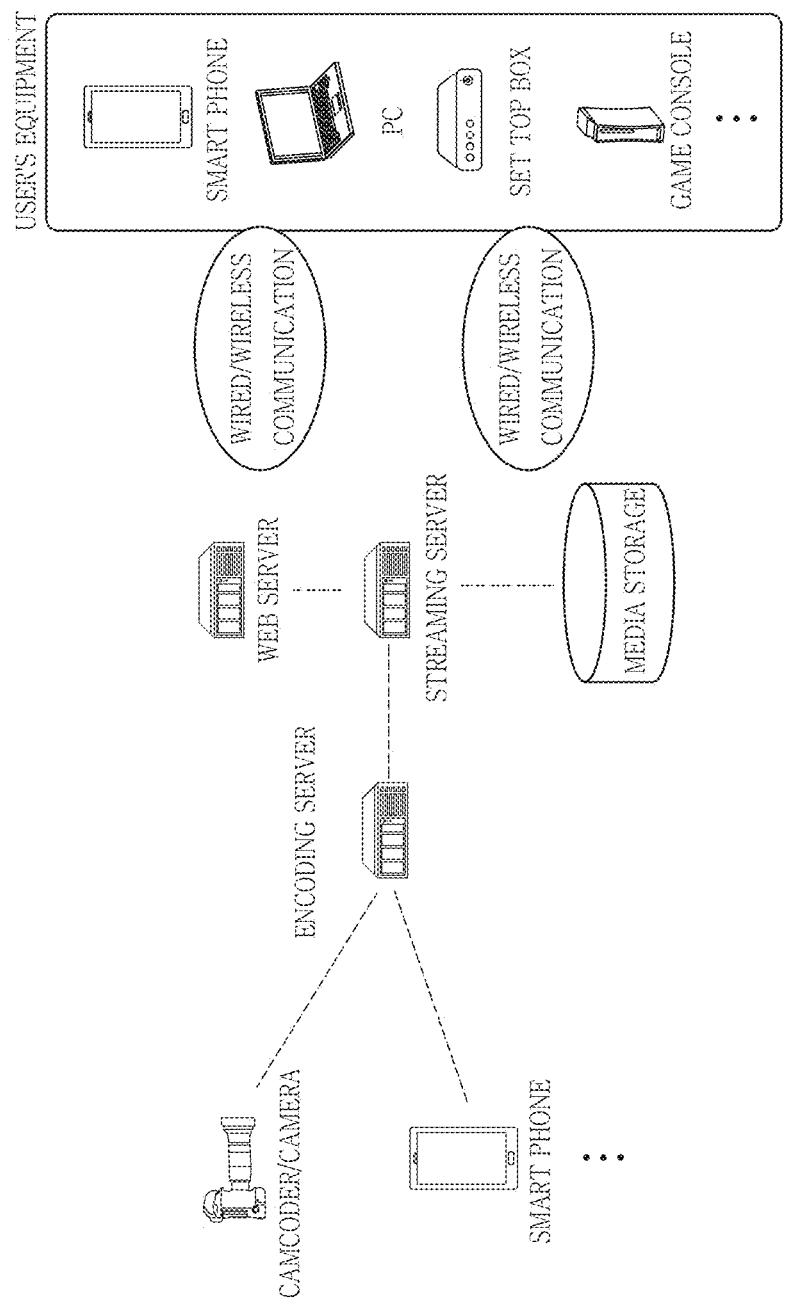
FIG. 15 shows an example of a content streaming system to which embodiments disclosed in the present disclosure can be applied.

FIGS. 13 and 14 schematically show an example of a video/image decoding method and related components according to embodiment(s) of the present disclosure. The method disclosed in FIG. 13 may be performed by the decoding apparatus illustrated in FIG. 3 or 14. Specifically, for example, S1300 of FIG. 13 may be performed by the entropy decoder 310 of the decoding apparatus, S1310 may be performed by the adder 340 of the decoding apparatus, and S1320 to S1330 may be performed by the filter 350 of the decoding apparatus.

Referring to FIG. 13, the decoding apparatus may receive/acquire video/image information (S1300). The video/image information may include prediction-related information and/or residual information. The decoding apparatus may receive/acquire the image/video information through a bitstream. Residual information may be generated through various encoding methods such as exponential Golomb, CAVLC, CABAC, etc. In an example, the video/image information may further include CCAL-related information. For example, In an example, the CCALF-related information may include a CCALF-enabled flag, a flag related to whether CCALF is available for a Cb (or Cr) color component, a Cb (or Cr) filter signal flag related to whether cross-component filters for a Cb (or Cr) color component are signaled, information related to the number of cross-component filters for the Cb (or Cr) color component, information on the absolute values of the cross-component filter coefficients for the Cb (or Cr) color component, information on the signs of the cross-component filter coefficients for the Cb (or Cr) color component, and/or information on whether a cross-component filter is applied to a current block of a Cb (or Cr) color component in the information (coding tree unit syntax) on the coding tree unit.

The image/video information may include various types of information according to an embodiment of the present disclosure. For example, the image/video information may include information disclosed in at least one of Tables 1 to 30 described above.

The decoding apparatus may derive transform coefficients. Specifically, the decoding apparatus may derive quantized transform coefficients based on the residual information. The transform coefficients may include luma transform coefficients and chroma transform coefficients. The quantized transform coefficients may have a one-dimensional vector form based on a coefficient scan order. The decoding apparatus may derive transform coefficients based on a dequantization process for the quantized transform coefficients.

The decoding apparatus may derive residual samples. The decoding apparatus may derive residual samples based on the transform coefficients. The residual samples may include residual luma samples and residual chroma samples. For example, residual luma samples may be derived based on the luma transform coefficients, and residual chroma samples may be derived based on the chroma transform coefficients. In addition, residual samples for the current block may be derived based on original samples and prediction samples of the current block.

The decoding apparatus may perform prediction based on the image/video information and derive prediction samples of the current block. The decoding apparatus may derive the prediction samples of the current block based on prediction-related information. The prediction related information may include prediction mode information. The decoding apparatus may determine whether inter prediction or intra prediction is applied to the current block based on the prediction mode information, and may perform prediction based thereon. Prediction samples may include prediction luma samples and/or prediction chroma samples.

The decoding apparatus may generate/derive reconstructed luma samples and/or reconstructed chroma samples (S1310). The reconstructed samples may include reconstructed luma samples and/or reconstructed chroma samples. The decoding apparatus may generate reconstructed luma samples based on residual luma samples. The decoding apparatus may generate reconstructed chroma samples based on the residual chroma samples. Luma components of the reconstructed samples may correspond to the reconstructed luma samples, and chroma components of the reconstructed samples may correspond to the reconstructed chroma samples.

The decoding apparatus may perform an adaptive loop filter (ALF) process for the reconstructed chroma samples to generate filtered reconstructed chroma samples (S1320). In the ALF process, the decoding apparatus may derive ALF filter coefficients for an ALF process of the reconstructed chroma samples. In addition, the decoding apparatus may derive ALF filter coefficients for the ALF process of the reconstructed luma samples. The ALF filter coefficients may be derived based on ALF parameters included in the ALF data in the APS.

The decoding apparatus may generate filtered reconstructed chroma samples. The decoding apparatus may generate filtered reconstructed samples based on the reconstructed chroma samples and the ALF filter coefficients.

In order to generate modified filtered reconstructed chroma samples, the decoding apparatus may perform a cross-component filtering process on the filtered reconstructed chroma samples (S1330). In the cross-component filtering process, the decoding apparatus may derive cross-component filter coefficients for the cross-component filtering. The cross-component filter coefficients may be derived based on CCALF-related information in the ALF data included in the aforementioned APS, and identifier (ID) information of the corresponding APS may be included in the slice header (may be signaled therethrough)

The decoding apparatus may generate modified filtered reconstructed chroma samples. The decoding apparatus may generate modified and filtered reconstructed chroma samples based on the reconstructed luma samples, the filtered reconstructed chroma samples, and the cross-component filter coefficients. In an example, the decoding apparatus may derive a difference between two samples among the reconstructed luma samples, and multiply the difference by one filter coefficient among the cross-component filter coefficients. Based on a multiplication result and the filtered reconstructed chroma samples, the decoding apparatus may generate the modified filtered reconstructed chroma samples. For example, the decoding apparatus may generate the modified filtered reconstructed chroma samples based on a sum of the product and one of the filtered reconstructed chroma samples.

In an embodiment, the image information may include a sequence parameter set (SPS). The SPS may include a CCALF-enabled flag related to whether the cross-component filtering is available. Based on a determination that the CCALF-enabled flag is 1, ID information (identifier information) of adaptation parameter sets (APSs) including ALF data used for derivation of cross-component filter coefficients for CCALF may be derived. The image information may include slice header information.

According to an example of an embodiment, the slice header information may include ID information of APSs including ALF data used for deriving the cross-component filter coefficients. In another example, based on a determination that the CCALF-enabled flag is 1, the slice header information may include ID information of the APSs including ALF data used for deriving the cross-component filter coefficients.

In an embodiment, the SPS may include an ALF-enabled flag (sps_ccalf_enabled_flag) related to whether ALF is available. Based on a determination that the value of the ALF enabled flag (sps_ccalf_enabled_flag) is 1, the SPS may include a CCALF enabled flag related to whether the cross-component filtering is available.

In an embodiment, the image information may include slice header information and an adaptation parameter set (APS). The header information may include information related to an identifier of the APS including the ALF data. For example, the cross-component filter coefficients may be derived based on the ALF data.

In an embodiment, the slice header information may include an ALF-enabled flag (slice_alf_enabled_flag) related to whether ALF is available. Sps_alf_enabled_flag and slice_alf_enabled_flag may be referred to as a first ALF-enabled flag and the ALF-enabled flag, respectively. Based on a determination that the value of the ALF enabled flag (slice_alf_enabled_flag) is 1, whether the value of the CCALF enabled flag is 1 may be determined. In an example, based on a determination that the value of the ALF-enabled flag is 1, the CCALF may be available.

In an embodiment, the header information (slice header information) may include a first flag related to whether CCALF is available for the Cb color component of the filtered reconstructed chroma samples and a second flag related to whether CCLF is available for the Cr color component of the filtered reconstructed chroma samples. In another example, based on a determination that the value of the ALF enabled flag (slice_alf_enabled_flag) is 1, the header information (slice header information) may include a first flag related to whether CCALF is available for the Cb color component of the filtered reconstructed chroma samples and a second flag related to whether CCLF is available for the Cr color component of the filtered reconstructed chroma samples.

In an embodiment, based on the determination that the value of the first flag is 1, the slice header information may include ID information (Information related to the identifier of the second APS) of the first APS for deriving cross-component filter coefficients for the Cb color component. Based on the determination that the value of the second flag is 1, the slice header information may include ID information (information related to the identifier of the second APS) of the second APS for deriving cross-component filter coefficients for the Cr color component.

In an embodiment, the first ALF data included in the first APS may include a Cb filter signal flag related to whether cross-component filters for the Cb color component are signaled. Based on the Cb filter signal flag, the first ALF data may include information related to the number of cross-component filters for the Cb color component. Based on information related to the number of cross-component filters for the Cb color component, the first ALF data may include information on absolute values of cross-component filter coefficients for the Cb color component and information on signs of the cross-component filter coefficients for the Cb color component. Based on the information on the information on absolute values of cross-component filter coefficients for the Cb color component and information on signs of the cross-component filter coefficients for the Cb color component, the cross-component filter coefficients for the Cb color component may be derived.

In an embodiment, information related to the number of cross-component filters for the Cb color component may be zero-order exponential Golomb ($0^{th}$ EG) coded.

In an embodiment, the second ALF data included in the second APS may include a Cr filter signal flag related to whether the cross-component filters for the Cr color component are signaled. Based on the Cr filter signal flag, the second ALF data may include information related to the number of cross-component filters for the Cr color component. Based on the information related to the number of cross-component filters for the Cr color component, the second ALF data may include information on absolute values of cross-component filter coefficients for the Cr color component and information on the signs of the cross-component filter coefficients for the Cr color component. Based on the absolute values of cross-component filter coefficients for the Cr color component and the information on the signs of the cross-component filter coefficients for the Cr color component, the cross-component filter coefficients for the Cr color component may be derived.

In an embodiment, the information related to the number of cross-component filters for the Cr color component may be zero-order exponential Golomb ($0^{th}$ EG) coded.

In an embodiment, the image information may include information on a coding tree unit. The information on the coding tree unit may include information on whether a cross-component filter is applied to the current block of a Cb color component and/or information on whether a cross-component filter is applied to the current block of a Cr color component.

In an embodiment, the information on the coding tree unit may include information on a filter set index of a cross-component filter applied to the current block of a Cb color component, and/or information on a filter set index of a cross-component filter applied to the current block of a Cr color component.

When there is a residual sample for the current block, the decoding apparatus may receive information on the residual for the current block. Information on the residual may include transform coefficients on residual samples. The decoding apparatus may derive residual samples (or residual sample array) for the current block based on the residual information. Specifically, the decoding apparatus may derive quantized transform coefficients based on the residual information. The quantized transform coefficients may have a one-dimensional vector form based on a coefficient scan order. The decoding apparatus may derive transform coefficients based on a dequantization process for the quantized transform coefficients. The decoding apparatus may derive residual samples based on the transform coefficients.

The decoding apparatus may generate reconstructed samples based on (intra) prediction samples and residual samples, and may derive a reconstructed block or a reconstructed picture based on the reconstructed samples. In more detail, the decoding apparatus may generate reconstructed samples based on a sum of (intra) prediction samples and residual samples. Thereafter, as described above, the decoding apparatus may apply an in-loop filtering process such as deblocking filtering and/or SAO process to the reconstructed picture in order to improve subjective/objective picture quality if necessary.

For example, the decoding apparatus may obtain image information including all or part of the aforementioned information (or syntax elements) by decoding the bitstream or encoded information. In addition, the bitstream or encoded information may be stored in a computer-readable storage medium, and may cause the aforementioned decoding method to be performed.

In the aforementioned embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the aforementioned embodiments of the present disclosure may be implemented in software form, and the encoding apparatus and/or decoding apparatus according to the present disclosure is, for example, may be included in the apparatus that performs the image processing of a TV, a computer, a smart phone, a set-top box, a display device, etc.

When the embodiments in the present disclosure are implemented in software, the aforementioned method may be implemented as a module (process, function, etc.) that performs the aforementioned function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present disclosure may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

FIG. 17 shows an example of a content streaming system to which embodiments disclosed in the present disclosure may be applied.

Referring to FIG. 17, the content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. Directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present disclosure may be combined and implemented as an apparatus, and the technical features of the apparatus claims of the present disclosure may be combined and implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined and implemented as a method.

What is claimed is:

1. An image decoding method performed by a decoding apparatus, the method comprising:
   receiving image information including prediction related information through a bitstream;
   deriving an intra prediction mode of a current block in a current picture based on the prediction related information;
   generating prediction luma samples and prediction chroma samples based on the intra prediction mode;
   generating reconstructed luma samples and reconstructed chroma samples based on the prediction luma samples and the prediction chroma samples;
   performing an adaptive loop filtering (ALF) process on the reconstructed chroma samples to generate filtered reconstructed chroma samples; and
   performing a cross-component filtering process on the filtered reconstructed chroma samples to generate modified filtered reconstructed chroma samples,
   wherein the image information includes information on cross-component filtering, and
   the performing of the cross-component filtering process includes:
   deriving a number of cross-component filters for the cross-component filtering based on the information on the cross-component filtering;
   deriving cross-component filter coefficients for the cross-component filtering process based on the number of cross-component filters; and
   generating the modified filtered reconstructed chroma samples based on the filtered reconstructed chroma samples and the cross-component filter coefficients,
   wherein the image information includes a sequence parameter set (SPS) and slice header information,
   wherein the SPS includes an ALF enabled flag related to whether the ALF process is enabled,
   wherein based on a determination that a value of the ALF enabled flag is 1, the SPS includes a cross-component adaptive loop filter (CCALF) enabled flag related to whether the cross-component filtering is enabled,
   wherein based on a determination that a value of the ALF enabled flag included in the SPS is 1, the slice header information includes an ALF enabled flag related to whether the ALF is enabled,
   wherein based on a determination that a value of the ALF enabled flag included in the slice header information is 1 and a value of the CCALF enabled flag included in the SPS is 1, the slice header information includes information on whether the CCALF is enabled for the filtered reconstructed chroma samples, and
   wherein based on a value of the information on whether the CCALF is enabled for the filtered reconstructed chroma samples being 1, the slice header information includes identification (ID) information of adaptation parameter sets (APSs) including ALF data used to derive the cross-component filter coefficients,
   wherein the image information includes information on a coding tree unit, and
   wherein the information on the coding tree unit includes:
   information on whether a cross-component filter is applied to a Cb color component of the current block, and information on whether a cross-component filter is applied to a Cr color component of the current block, and
   information on a filter set index of a cross-component filter applied to the Cb color component of the current block, and information on a filter set index of a cross-component filter applied to the Cr color component of the current block.

2. An image encoding method performed by an encoding apparatus, the method comprising:
   determining an intra prediction mode for a current block in a current picture;
   generating prediction luma samples and prediction chroma samples based on the intra prediction mode;
   generating reconstructed luma samples and reconstructed chroma samples based on the prediction luma samples and the prediction chroma samples;
   deriving adaptive loop filtering (ALF) filter coefficients for an ALF process;

generating ALF-related information based on the ALF filter coefficients;

deriving cross-component filters and cross-component filter coefficients for a cross-component filtering process;

generating cross-component filtering-related information based on the cross-component filters and the cross-component filter coefficients; and encoding image information including information for generating the reconstructed samples, the ALF-related information, and the cross-component filtering-related information, wherein the cross-component filtering-related information includes information on a number of the cross-component filters and information on the cross-component filter coefficients, wherein the image information includes a sequence parameter set (SPS) and slice header information, wherein the SPS includes an ALF enabled flag related to whether the ALF process is enabled, wherein based on a determination that a value of the ALF enabled flag is 1, the SPS includes a cross-component adaptive loop filter (CCALF) enabled flag related to whether the cross-component filtering is enabled, wherein based on a determination that a value of the ALF enabled flag included in the SPS is 1, the slice header information includes an ALF enabled flag related to whether the ALF is enabled, wherein based on a determination that a value of the ALF enabled flag included in the slice header information is 1 and a value of the CCALF enabled flag included in the SPS is 1, the slice header information includes information on whether the CCALF is enabled for the filtered reconstructed chroma samples, and wherein based on a value of the information on whether the CCALF is enabled for the filtered reconstructed chroma samples being 1, the slice header information includes identification (ID) information of adaptation parameter sets (APSs) including ALF data used to derive the cross-component filter coefficients, wherein the image information includes information on a coding tree unit, and wherein the information on the coding tree unit includes:

information on whether a cross-component filter is applied to a Cb color component of the current block, and information on whether a cross-component filter is applied to a Cr color component of the current block, and information on a filter set index of a cross-component filter applied to the Cb color component of the current block, and information on a filter set index of a cross-component filter applied to the Cr color component of the current block.

3. A non-transitory computer-readable storage medium storing a bitstream generated by the image encoding method of claim 2.

4. A transmission method of data for an image, the method comprising:

obtaining a bitstream of the image, wherein the bitstream is generated based on determining an intra prediction mode for a current block in a current picture, generating prediction luma samples and prediction chroma samples based on the intra prediction mode, generating reconstructed luma samples and reconstructed chroma samples based on the prediction luma samples and the prediction chroma samples, deriving adaptive loop filtering (ALF) filter coefficients for an ALF process, generating ALF-related information based on the ALF filter coefficients, deriving cross-component filters and cross-component filter coefficients for a cross-component filtering process, generating cross-component filtering-related information based on the cross-component filters and the cross-component filter coefficients, and encoding image information including information for generating the reconstructed samples, the ALF-related information, and the cross-component filtering-related information; and transmitting the data comprising the bitstream, wherein the cross-component filtering-related information includes information on a number of the cross-component filters and information on the cross-component filter coefficients, wherein the image information includes a sequence parameter set (SPS) and slice header information, wherein the SPS includes an ALF enabled flag related to whether the ALF process is enabled, wherein based on a determination that a value of the ALF enabled flag is 1, the SPS includes a cross-component adaptive loop filter (CCALF) enabled flag related to whether the cross-component filtering is enabled, wherein based on a determination that a value of the ALF enabled flag included in the SPS is 1, the slice header information includes an ALF enabled flag related to whether the ALF is enabled, wherein based on a determination that a value of the ALF enabled flag included in the slice header information is 1 and a value of the CCALF enabled flag included in the SPS is 1, the slice header information includes information on whether the CCALF is enabled for the filtered reconstructed chroma samples, and wherein based on a value of the information on whether the CCALF is enabled for the filtered reconstructed chroma samples being 1, the slice header information includes identification (ID) information of adaptation parameter sets (APSs) including ALF data used to derive the cross-component filter coefficients, wherein the image information includes information on a coding tree unit, and wherein the information on the coding tree unit includes:

information on whether a cross-component filter is applied to a Cb color component of the current block, and information on whether a cross-component filter is applied to a Cr color component of the current block, and information on a filter set index of a cross-component filter applied to the Cb color component of the current block, and information on a filter set index of a cross-component filter applied to the Cr color component of the current block.

* * * * *